United States Patent
Tabata

Patent Number: 6,088,006
Date of Patent: *Jul. 11, 2000

[54] STEREOSCOPIC IMAGE GENERATING SYSTEM FOR SUBSTANTIALLY MATCHING VISUAL RANGE WITH VERGENCE DISTANCE

[75] Inventor: Seiichiro Tabata, Hino, Japan

[73] Assignee: Olympus Optical Co., Ltd., Tokyo, Japan

[*] Notice: This patent is subject to a terminal disclaimer.

[21] Appl. No.: 08/761,323

[22] Filed: Dec. 10, 1996

[30] Foreign Application Priority Data

Dec. 20, 1995 [JP] Japan .................................. 7-348499

[51] Int. Cl.⁷ .................................................. G09G 5/00
[52] U.S. Cl. .................................. 345/7; 348/42; 348/51; 348/54
[58] Field of Search ........................... 345/7, 8; 348/42, 348/43, 44, 45, 51, 52, 54, 55

[56] References Cited

U.S. PATENT DOCUMENTS

| | | | |
|---|---|---|---|
| 4,752,824 | 6/1988 | Moore | 345/7 |
| 4,819,064 | 4/1989 | Diner | 348/42 |
| 4,966,436 | 10/1990 | Mayhew et al. | 348/54 |
| 5,065,236 | 11/1991 | Diner | 348/42 |
| 5,612,709 | 3/1997 | Sudo et al. | 345/7 |
| 5,682,171 | 10/1997 | Yokoi | 345/7 |
| 5,726,704 | 3/1998 | Uomori | 348/51 |
| 5,801,760 | 9/1998 | Uomori | 348/51 |
| 5,825,456 | 10/1998 | Tabata et al. | 348/51 |

FOREIGN PATENT DOCUMENTS

0641132A1 of 0000 European Pat. Off. .
6-85590 of 0000 Japan .

OTHER PUBLICATIONS

"E–D CG," edited by the Institute of Television in Japan, Ohm Publishing Company, pp. 1–27, 1994.

"O plus E No. 73," Co. Ltd. Shingijyutsu Communications, Dec. 1985, pp. 98–109, Seiri Kogaku (Physiology Optics).

15, Three–Dimensional DIsplay, Toyohiko Hatada (Tokyo Kogei University, Department of Technology).

*Primary Examiner*—Jeffery A. Hofsass
*Assistant Examiner*—John Tweel, Jr.
*Attorney, Agent, or Firm*—Laff, Whitesel & Saret, Ltd.; J. Warren Whitesel

[57] ABSTRACT

A storage unit stores three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system. First and second rendering units generate first and second two-dimensional image data obtained by rendering the plurality of objects in the three-dimensional coordinate system from the first and second viewpoints, respectively. A two-dimensional image data control unit controls to translate all two-dimensional image data of at least one of the first and second two-dimensional image data which are obtained by the first and second rendering units for a specific object arbitrarily selected from the plurality of objects, so that a difference between horizontal displacement amounts from the centers of the first and second two-dimensional image data is set substantially constant.

48 Claims, 23 Drawing Sheets

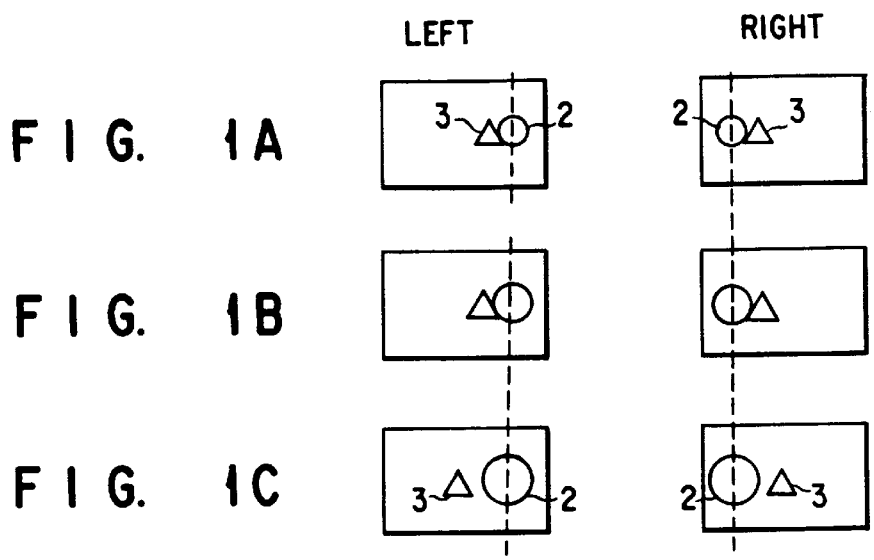
FIG. 1A
FIG. 1B
FIG. 1C
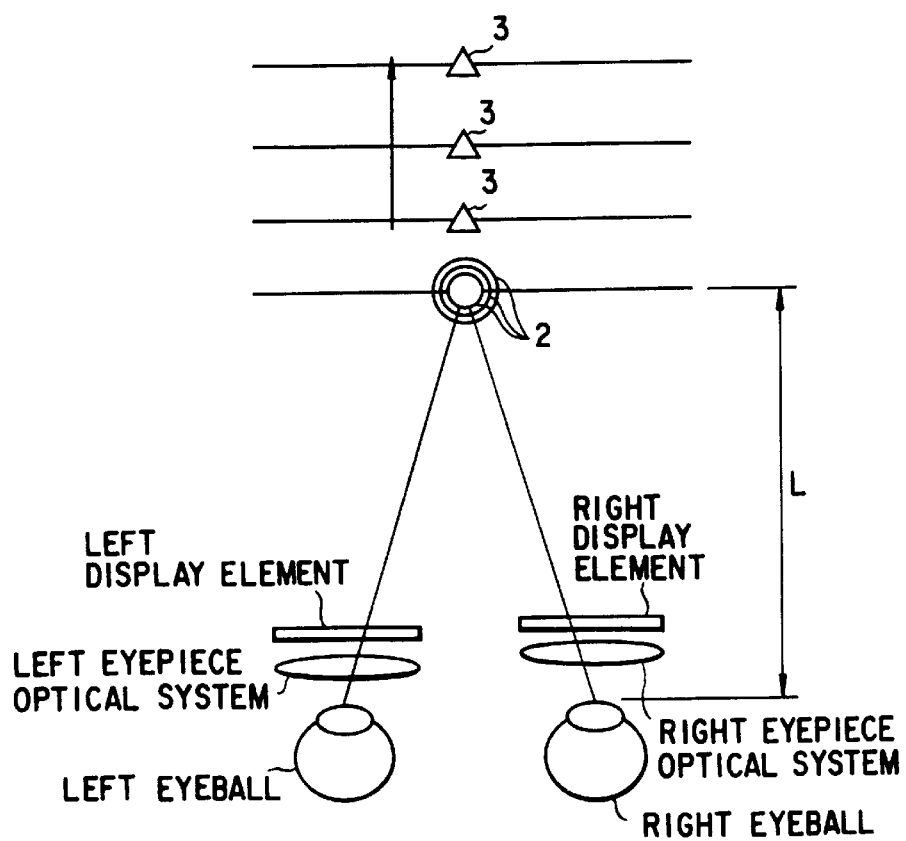
FIG. 2

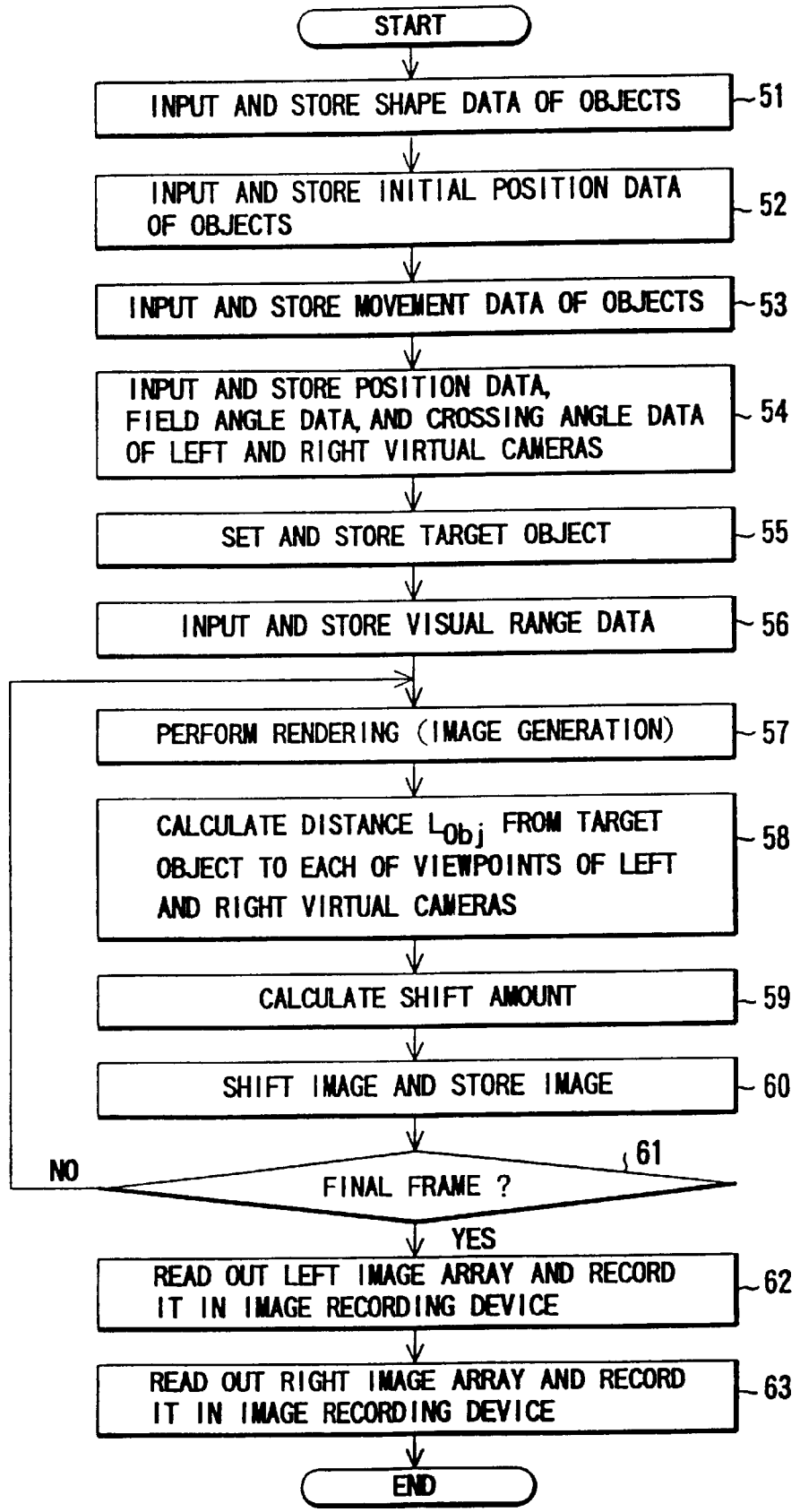
F I G. 7

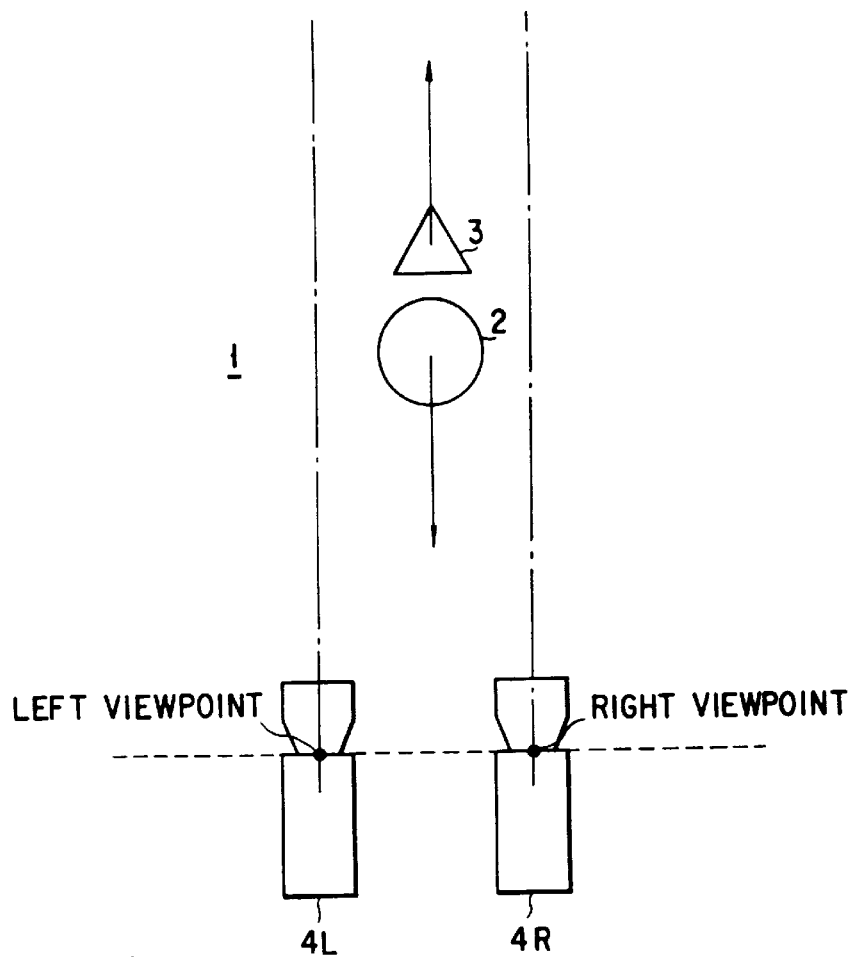
FIG. 10
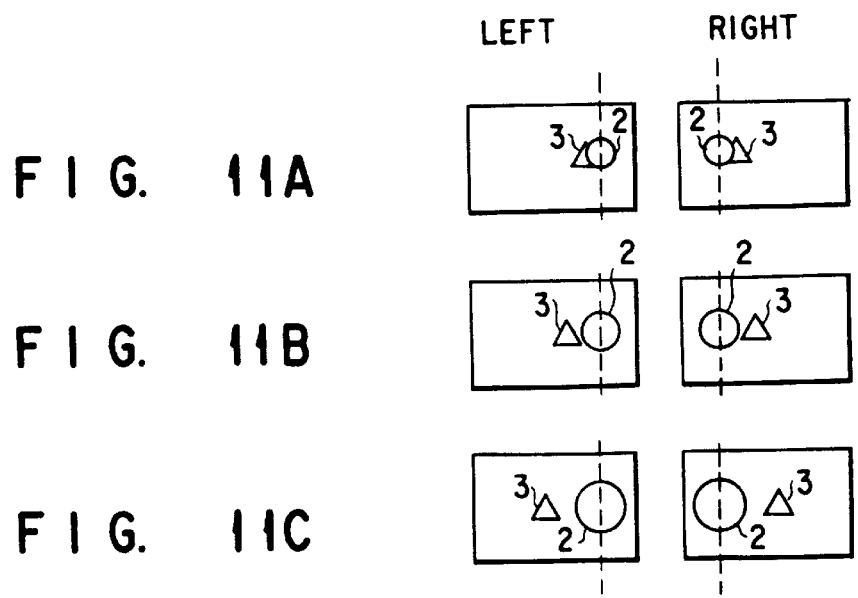
FIG. 11A
FIG. 11B
FIG. 11C

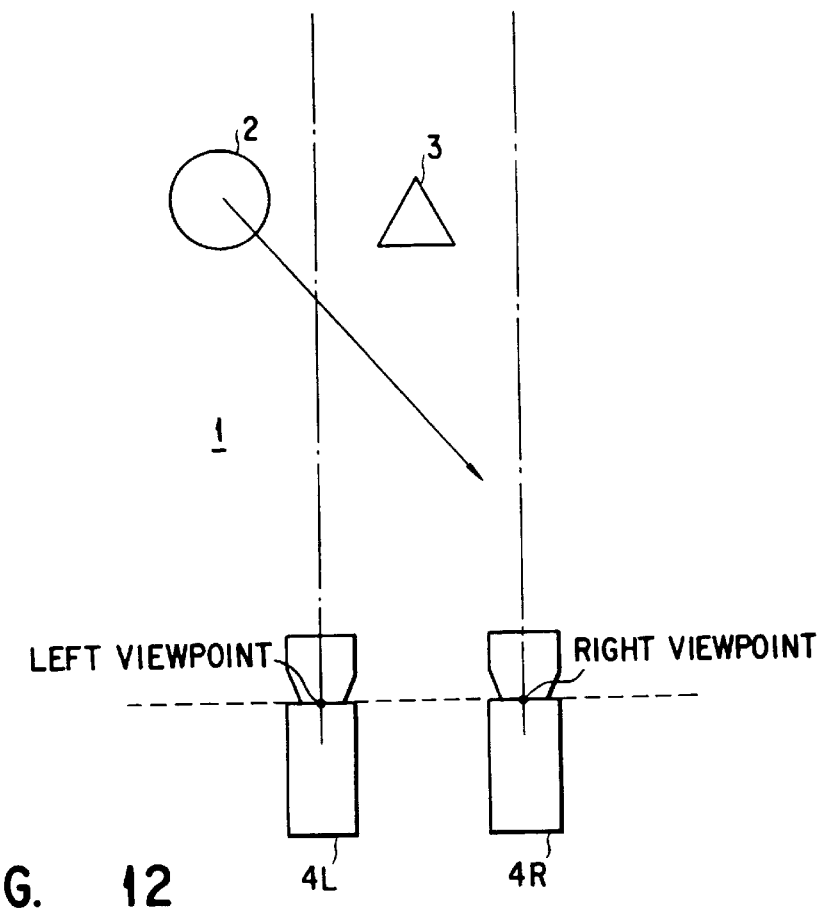
FIG. 12
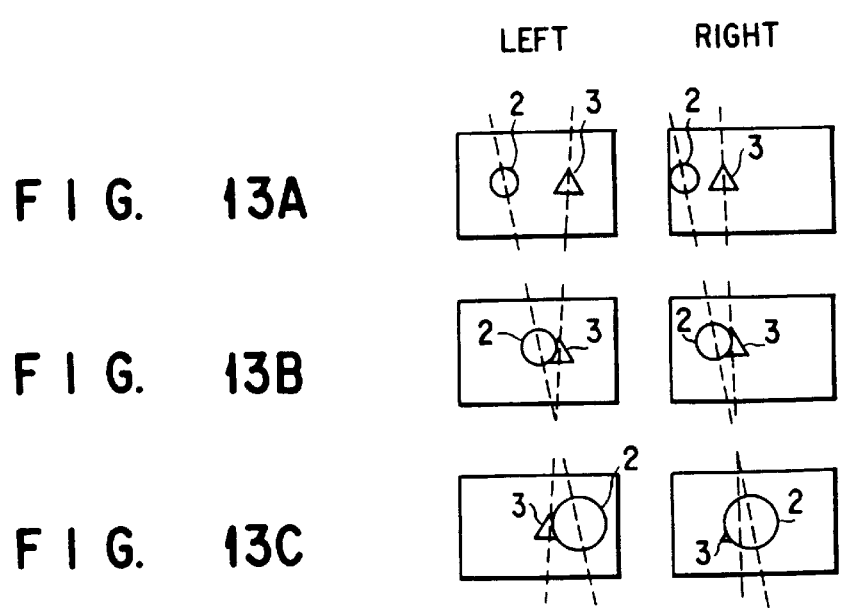
FIG. 13A
FIG. 13B
FIG. 13C

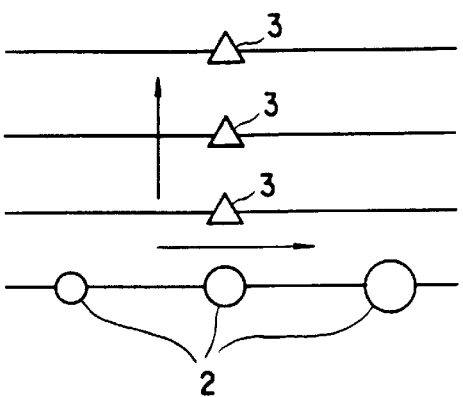
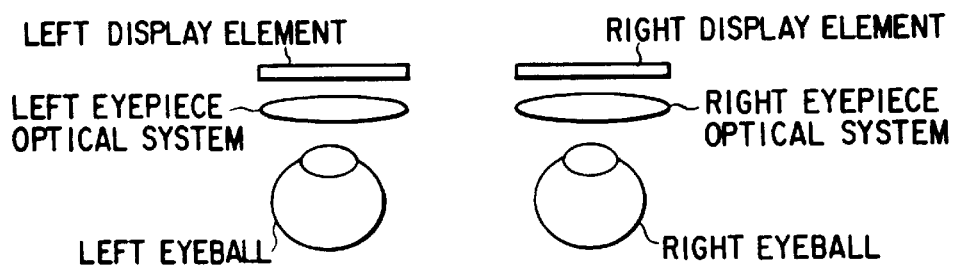
F I G. 14
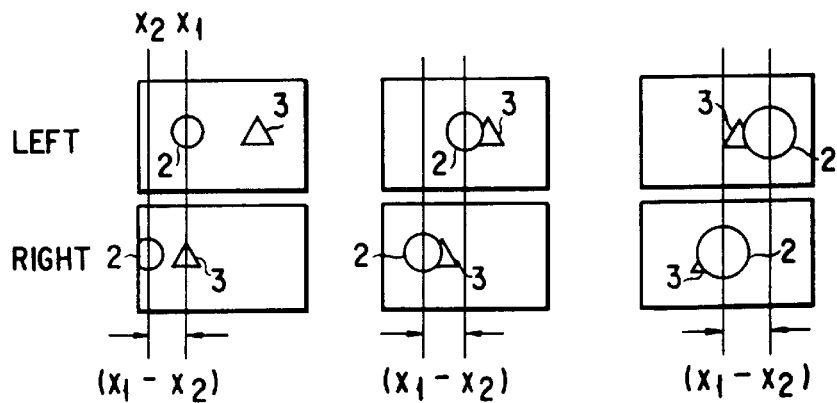
F I G. 15A   F I G. 15B   F I G. 15C

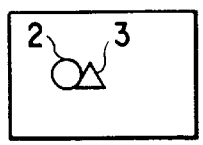
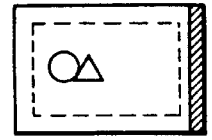
F I G. 16A  F I G. 16B
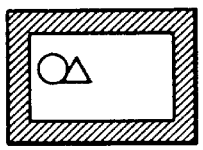
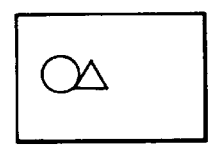
F I G. 16C  F I G. 16D
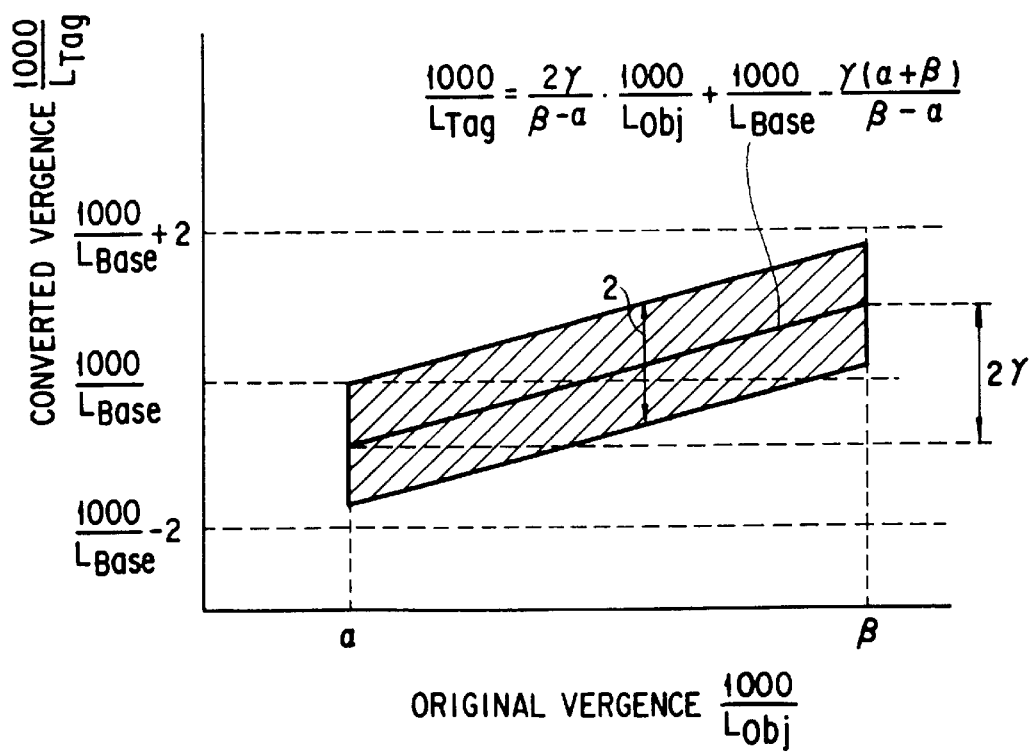
F I G. 19

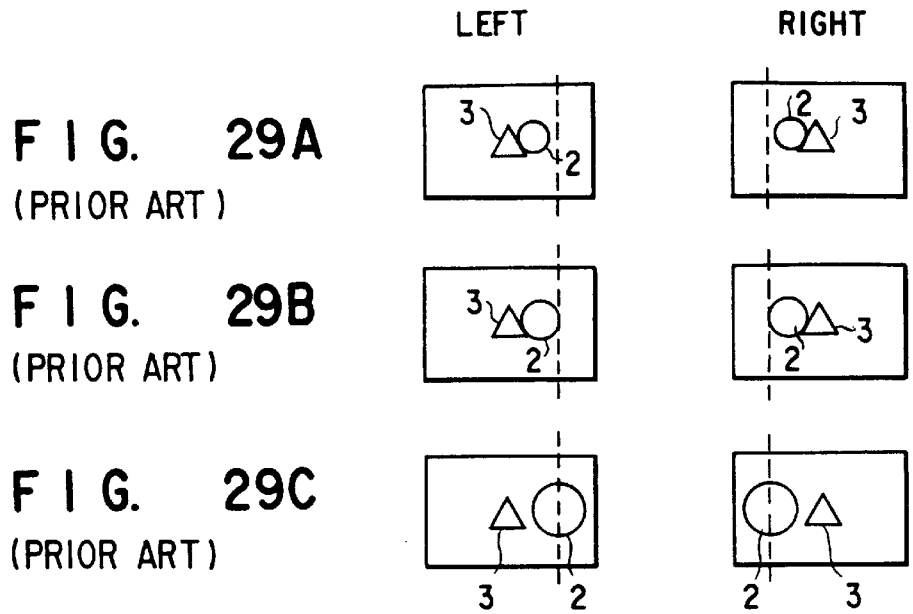
FIG. 29A (PRIOR ART)
FIG. 29B (PRIOR ART)
FIG. 29C (PRIOR ART)
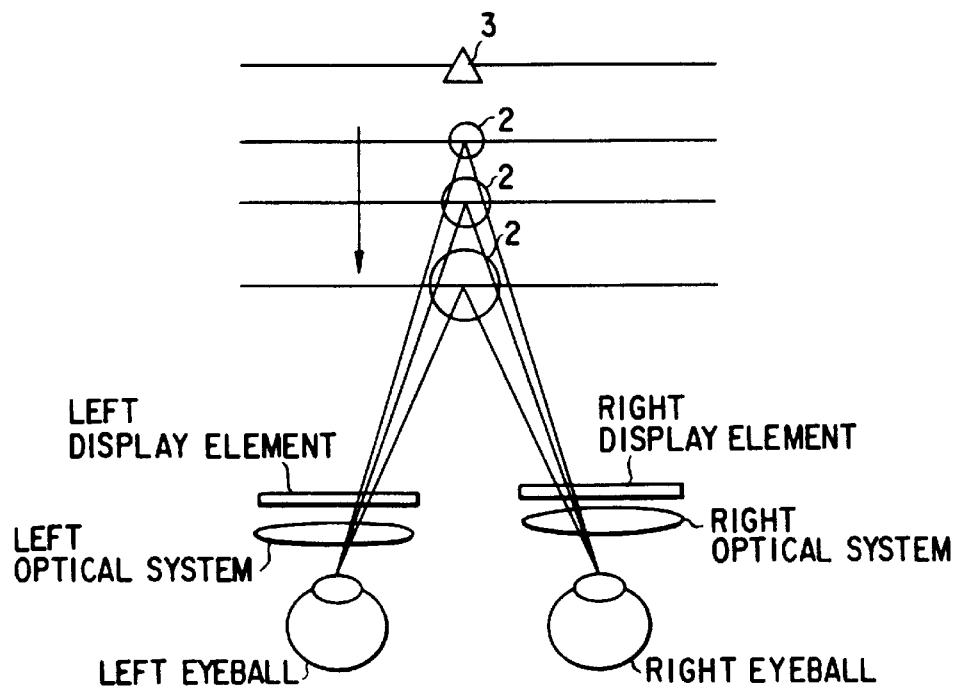
FIG. 30 (PRIOR ART)

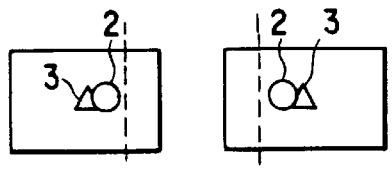
FIG. 31A
(PRIOR ART)
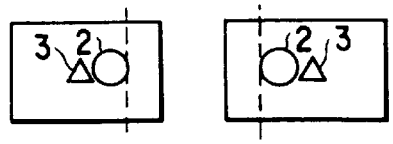
FIG. 31B
(PRIOR ART)
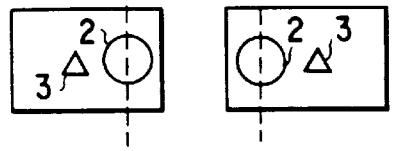
FIG. 31C
(PRIOR ART)
FIG. 32A
(PRIOR ART)
FIG. 32B
(PRIOR ART)
FIG. 32C
(PRIOR ART)
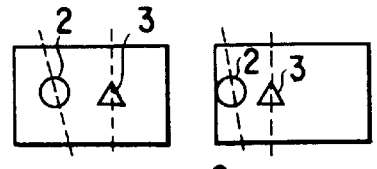
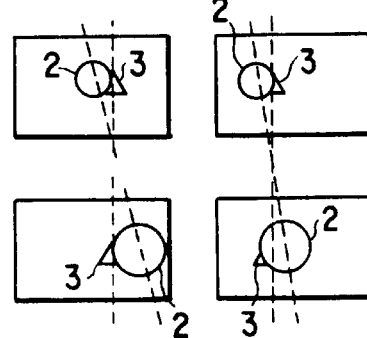
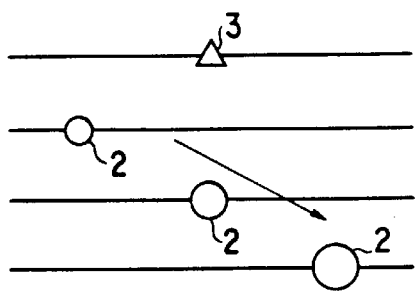
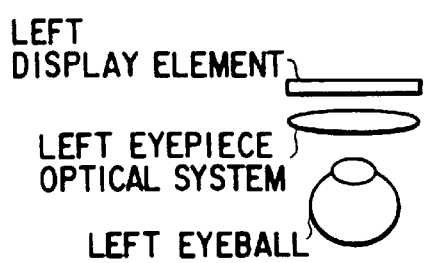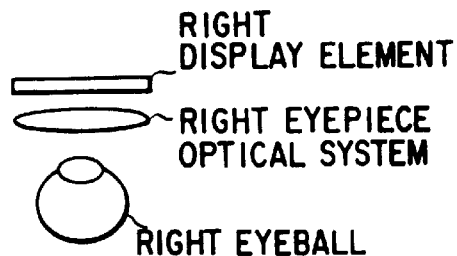
FIG. 33

STEREOSCOPIC IMAGE GENERATING SYSTEM FOR SUBSTANTIALLY MATCHING VISUAL RANGE WITH VERGENCE DISTANCE

BACKGROUND OF THE INVENTION

1. Field of the Invention

The present invention relates to a stereoscopic image generating apparatus and, more particularly, to a stereoscopic image generating apparatus for generating a stereoscopic image which can be easily observed by an observer.

2. Description of the Related Art

As a conventional technique for generating a stereoscopic image using a computer, there is known a method of sensing the images of a plurality of objects located in a virtual three-dimensional space, using left and right virtual cameras located in the virtual three-dimensional space, to generate three-dimensional images in accordance with a CG (Computer Graphics) technique disclosed in, e.g., "3-D CG", edited by the Institute of Television in Japan, Ohm Publishing Company, pp. 1–27, 1994.

According to this method, left and right two-dimensional images having a parallax are obtained. At the same time, to create a stereoscopic moving picture, an object is moved with time with respect to the left and right virtual cameras fixed in the virtual three-dimensional space, or the left and right virtual cameras are moved with time with respect to a plurality of fixed objects, thereby obtaining a plurality of images which constitute a stereoscopic moving picture.

FIG. 27 is a flow chart for explaining the conventional stereoscopic image creating method using the CG technique.

In steps 101 to 103 of FIG. 27, the shape data, initial position data, and time movement data (motion data) of a plurality of objects are input and stored in an external storage device.

In step 104, the position data, field angle data, and crossing angle (posture) data of the left and right virtual cameras are input and stored in the external storage device.

In steps 105 and 106, generation (rendering) of left and right two-dimensional images is performed for all frames on the basis of the data stored in steps 101 to 104.

Assume that a ball 2 and a trigonal pyramid 3 which serve as objects, and left and right virtual cameras 4L and 4R are located in a virtual three-dimensional space 1, as shown in FIG. 28, and that the ball 2 is moved to come close to the left and right virtual cameras 4L and 4R. In the processing of steps 101 to 106, the ball 2 is moved to the right in the left image and to the left in the right image while being enlarged when the ball 2 comes closer to the cameras, thereby forming an array of left images and an array of right images, as shown in FIGS. 29A and 29B.

The left and right image arrays thus generated are read out in steps 107 and 108, respectively. The images are stored in the order (time serial order) of, e.g., FIGS. 29A, 29B, and 29C.

These left and right image arrays are recorded on a recording medium such as a video tape using an image recording device such as a video deck.

The resultant stereoscopic image is observed on a stereoscopic display.

A head-mounted display (HMD) as one of the stereoscopic displays used for stereoscopic image observation is a kind of two-eye stereoscopic display. The left and right display elements and the left and right eyepiece optical systems are located in front of the left and right eyeballs of an observer, respectively. A left eye image is presented to the left eyeball, and a right eye image is presented to the right eyeball, so that the observer can observe the presented images as a stereoscopic image.

The observation order of the objects in the images with, e.g., the HMD in the order of the array of images in FIGS. 29A, 29B, and 29C is shown in FIG. 30.

That is, the ball 2 in FIG. 30 is moving in a direction indicated by an arrow with the lapse of time to be enlarged or popped up toward the eyeballs of the observer.

In this case, since the visual range of the images is determined by the eyepiece optical systems of the HMD, the focusing action of the eyeballs of the observer is set in the fixed state.

That is, the visual range does not coincide with the vergence distance with reference to the ball 2 in the image.

This phenomenon also occurs in various stereoscopic television systems such as a shutter switching system and a reticular system in addition to the HMD.

The visual range in such a stereoscopic television system is a distance from a display device such as a CRT (Cathode-Ray Tube) to the eyeballs of the observer.

The visual range in the HMD is a distance from each of the virtual image planes generated by the eyepiece optical systems to a corresponding one of the eyeballs of the observer.

In stereoscopic image observation, when the observer observes images whose pop-up amounts are large while the visual range does not coincide with the vergence distance, since the resultant stereoscopic image is unnaturally observed, there is a case of resulting in asthenopia due to the observer.

To solve this problem, images whose change in pop-up amount is small are generated. In this case, however, the stereoscopic image impression given to the observer is weakened.

To solve the above problem, Jpn. Pat. Appln. KOKOKU Publication No. 6-85590 discloses a technique for mechanically driving eyepiece lenses of the HMD in stereoscopic image observation to change the visual range in accordance with the generated images.

In this technique, a device for "mechanically driving the eyepiece lenses" must be added to the HMD, inevitably resulting in an increase in cost.

SUMMARY OF THE INVENTION

The present invention has been made in consideration of the conventional problems described above, and has as its object to provide a computer-aided stereoscopic image generating apparatus capable of generating a stereoscopic image which allows an observer to receive a sufficient stereoscopic impression while a change in pop-up amount of a specific object in an image is kept small without requiring an additional device like the one in Jpn. Pat. Appln. KOKOKU Publication No. 6-85590, wherein a visual range can be made to almost coincide with a vergence distance to give a natural stereoscopic impression.

According to the first aspect of the present invention, there is provided a stereoscopic image generating apparatus comprising storage means for storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system, first rendering means for generating, on the basis of the data stored in the storage means, first two-dimensional image data obtained by rendering the plurality of objects in the three-dimensional coordinate system from the first viewpoint, second rendering means for generating, on the basis of the data stored in the storage means, second two-dimensional image data obtained by rendering the plurality of objects in the three-dimensional coordinate system from the second viewpoint, and two-dimensional image data control means for controlling to translate all two-dimensional image data of at least one of the first and second two-dimensional image data which are obtained by the first and second rendering means for a specific object arbitrarily selected from the plurality of objects, so that a difference between horizontal displacement amounts from the centers of the first and second two-dimensional image data is set substantially constant.

According to the second aspect of the present invention, there is provided a stereoscopic image generating apparatus for generating moving pictures of left and right viewpoints, comprising rendering means for rendering a plurality of images including at least one image whose size changes with time in each of the moving pictures of the left and right viewpoints, so that the plurality of images have a parallax, first image control means for controlling to translate one specific image of the images whose sizes change with time and which are rendered by the rendering means, so that a difference in the one specific image between horizontal displacement amounts from the centers of the moving pictures of the left and right viewpoints is set substantially constant, and second image control means for controlling to translate remaining images of each of the moving pictures of the left and right viewpoints with respect to the one specific image in accordance with a change in size of the one specific image rendered by the rendering means.

According to the third aspect of the present invention, there is provided a stereoscopic image generating apparatus for generating first and second moving pictures having different viewpoints, comprising rendering means for rendering a plurality of images including at least one image whose size changes with time in each of the first and second moving pictures, so that the plurality of images have a parallax, first image control means for controlling one specific image of the images whose sizes change with time and which are rendered by the rendering means, so that a difference in the one specific image between horizontal displacement amounts from the centers of the first and second moving pictures is set substantially constant, and second image control means for controlling remaining images of each of the first and second moving pictures, so that a difference in the remaining images of each of the first and second moving pictures between horizontal displacement amounts from the centers of the first and second moving pictures is changed.

According to the fourth aspect of the present invention, there is provided a stereoscopic image generating apparatus comprising storage means for storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system, first rendering means for generating, on the basis of the data stored in the storage means, first two-dimensional image data obtained by rendering the plurality of objects in the three-dimensional coordinate system from the first viewpoint, second rendering means for generating, on the basis of the data stored in the storage means, second two-dimensional image data obtained by rendering the plurality of objects in the three-dimensional coordinate system from the second viewpoint, first two-dimensional image data control means for controlling to translate all the first two-dimensional data generated by the first rendering means, and second two-dimensional image data control means for controlling to translate all the second two-dimensional image data from the second rendering means in a movement amount different from a translation amount of the first two-dimensional image data control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A, 1B, and 1C are views showing images generated by a stereoscopic image generating apparatus of the present invention;

FIG. 2 is a view for explaining how objects in an image are seen when the images in FIGS. 1A, 1B, and 1C are observed;

FIG. 7 is a flow chart showing stereoscopic image generation processing executed by a processing device in the first embodiment;

FIG. 10 is a view showing the arrangement state of objects and left and right virtual cameras in a virtual three-dimensional space when images are to be generated in the first embodiment;

FIGS. 11A, 11B, and 11C are views showing images generated by the stereoscopic image generating apparatus of the first embodiment;

FIG. 12 is a view showing another arrangement state of objects and left and right virtual cameras in the virtual three-dimensional space when images are to be generated in the first embodiment;

FIGS. 13A, 13B, and 13C are views showing other images generated by the stereoscopic image generating apparatus of the first embodiment;

FIG. 14 is a view for explaining how objects in an image are seen when the images in FIGS. 13A, 13B, and 13C are observed;

FIGS. 15A, 15B, and 15C are views showing the arrangement state of specific objects in the images generated by the stereoscopic image generating apparatus of the first embodiment;

FIGS. 16A, 16B, 16C, and 16D are views showing images generated in stereoscopic image generation processing according to the second embodiment of the present invention;

FIG. 19 is a graph for explaining the principle of stereoscopic image generation processing according to the fourth embodiment of the present invention;

FIGS. 29A, 29B, and 29C are views showing images generated by the conventional case;

FIG. 30 is a view how objects in the images are seen when the images in FIGS. 29A, 29B, and 29C are observed;

FIGS. 31A, 31B, and 31C are views showing images generated by the conventional case when settings in FIG. 10 are used;

FIGS. 32A, 32B, and 32C are views showing images generated by the conventional case when the settings in FIG. 12 are used;

FIG. 33 is a view for explaining how an object in images is seen when the images in FIGS. 32A, 32B, and 32C are observed.

DETAILED DESCRIPTION OF THE PREFERRED EMBODIMENTS

Figure 4:
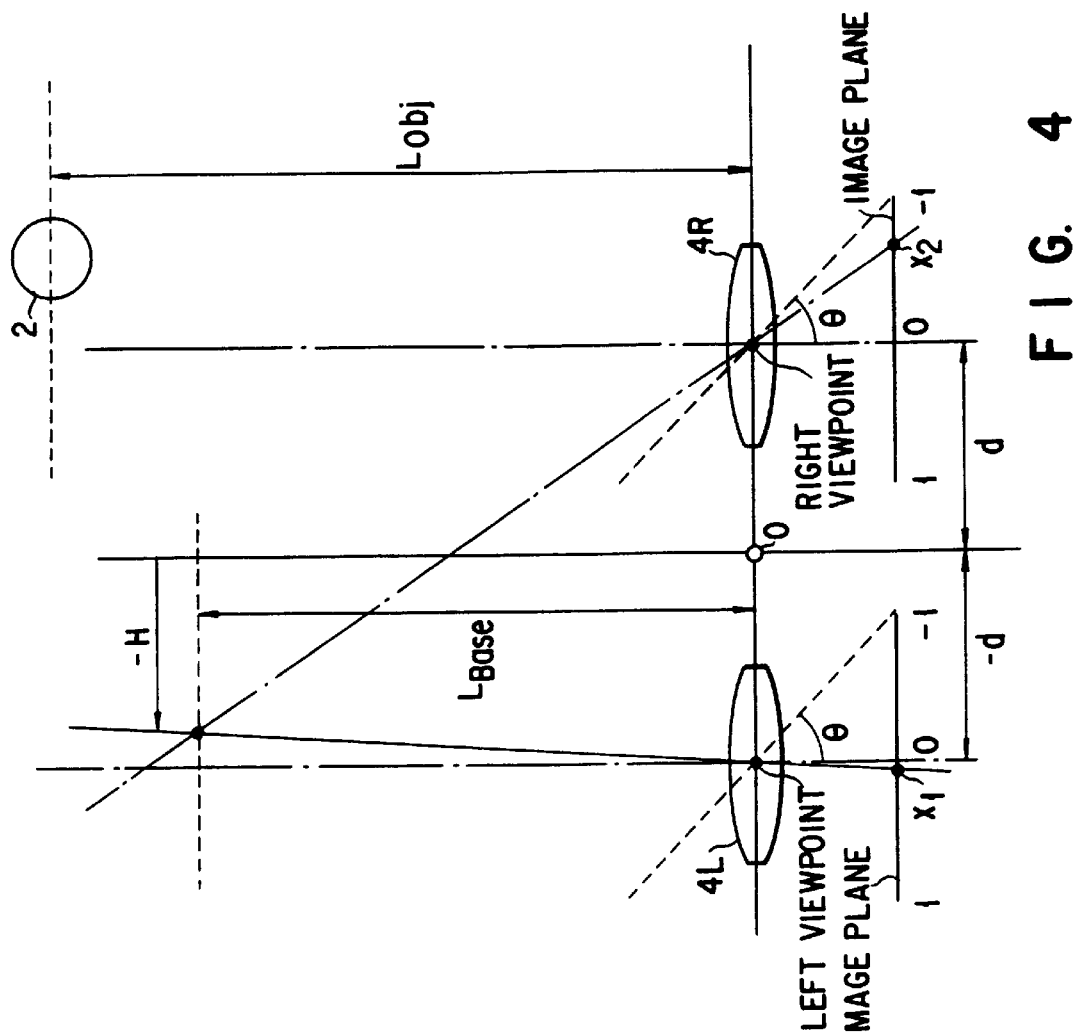
FIG. 4 is a view showing the arrangement state of an object and left and right virtual cameras in a virtual three-dimensional space when an image is to be generated by the stereoscopic image generating apparatus of the present invention.

Reference will now be made in detail to the presently preferred embodiments of the invention as illustrated in the accompanying drawings, in which like reference characters designate like or corresponding parts throughout the several drawings.

The present invention will be generally described below.

The present invention provides a stereoscopic image generating apparatus capable of generating left and right image arrays in which the positions of a ball 2 to be displayed rarely change even if the ball 2 is separated from or comes close to the eyeballs of an observer, as shown in FIGS. 1A, 1B, and 1C.

When the images in FIGS. 1A, 1B, and 1C are displayed with, e.g., an HMD in the order named, the stereoscopic space represented by the HMD can be seen, as shown in, e.g., FIG. 2.

More specifically, the ball 2 is enlarged with time, but the distance (vergence distance) between the ball 2 and the eyeballs of the observer does not change.

The size of a trigonal pyramid 3 does not change with time, but the trigonal pyramid 3 is separated from the eyeballs of the observer with time, as indicated by an arrow in FIG. 2.

That is, the distance between the ball 2 and the trigonal pyramid 3 increases with time. Therefore, the ball 2 is seen as if it were popped up with time as the feeling of the observer, as in the conventional case of FIG. 30.

The present invention utilizes the human visual sensitivity in which the human eye is sensitive to a change in relative distance, but is not sensitive to detection of an absolute distance.

More specifically, according to an experiment conducted by the present inventor, the following facts were found. When a stereoscopic image in which only one object whose vergence distance changes is present in a black background is to be observed, the observer observes this object as if its distance were not changed. When a plurality of objects whose motions are different from each other in a stereoscopic image are observed, the observer feels a stereoscopic impression.

A change in distance between a given object and another object can be recognized by an observer, but a change in distance of a single object is difficult to recognize.

In the stereoscopic image presented by the images in FIGS. 1A, 1B, and 1C, the distance between the ball 2 and the trigonal pyramid 3 changes, the size of the ball 2 changes, and the size of the trigonal pyramid 3 does not change. Therefore, the observer sees the objects as if the ball 2 were coming close to the eyeballs and the trigonal pyramid 3 were kept stopped.

According to the present invention, the pop-up amount of the ball 2 does not almost change, thereby presenting an image which gives a sufficient stereoscopic impression.

According to the present invention shown in FIG. 2, there can be solved a conventional problem that is resulting in asthenopia.

When a vergence distance L of the ball 2 in FIG. 2 is made to coincide with the visual range of eyepiece lenses, the visual range is always made to coincide with the vergence distance, thus providing a more advantageous effect.

An object whose vergence distance is thus fixed is called a target object.

Conditions for a stereoscopic image to be actually generated will be obtained.

In order to make the vergence distance L of the target object in stereoscopic observation equal to a visual range $L_{Base}$, a horizontal displacement amount $x_1$ from the center of the left image of the ball 2 and a horizontal displacement amount $x_2$ from the center of the right image of the ball 2 in FIG. 3 must satisfy equations (1) and (2) below:

$$x_1 = \frac{d + (-H)}{L_{Base}} \cdot \frac{1}{\tan\theta} \quad (1)$$

$$x_2 = \frac{-d + (-H)}{L_{Base}} \cdot \frac{1}{\tan\theta} \quad (2)$$

Equations (1) and (2) are calculated using FIG. 4.

Referring to FIG. 4, reference symbols d denote the distance between the left viewpoint of a left virtual camera 4L and a middle point O between the left and right viewpoints of the left virtual camera 4L and a right virtual camera 4R, and the distance between the right viewpoint and the middle point O. The distance d is set as +d on the right viewpoint side and −d on the left viewpoint side.

Reference symbol $L_{Base}$ denotes the visual range; θ, the horizontal half field angle of each of the left and right virtual cameras 4L and 4R; and −H, the arbitrary horizontal coordinate on the $L_{Base}$.

Reference symbol $L_{obj}$ denotes the distance (vergence distance) from the center of the target object 2 to the right or left viewpoint in the direction of depth.

Equations (1) and (2) derive equation (3) as follows:

$$(x_1 - x_2) = \frac{2d}{L_{Base}} \cdot \frac{1}{\tan\theta} \quad (3)$$

The vergence occurs when the horizontal displacement amount $x_1$ from the center of the left image of the ball 2 serving as an object in stereoscopic image observation is different from the horizontal displacement amount $x_2$ from the center of the right image of the ball 2. When the difference $(x_1-x_2)$ between the horizontal displacements of the ball 2 satisfies equation (3), the vergence distance of the ball 2 becomes $L_{Base}$.

When left and right images which satisfy equation (3) are generated, the observer can feel a sufficient stereoscopic impression while a change in pop-up amount of the target object in the image is kept small. In addition, when the visual range is made to almost coincide with the vergence distance with respect to the target object in the left and right images, a more natural stereoscopic impression can be given to the observer.

A condition for allowing the pop-up amount of the ball 2 serving as a target object within q2 diopter centered on $L_{Base}$ will be obtained below.

Figure 5:
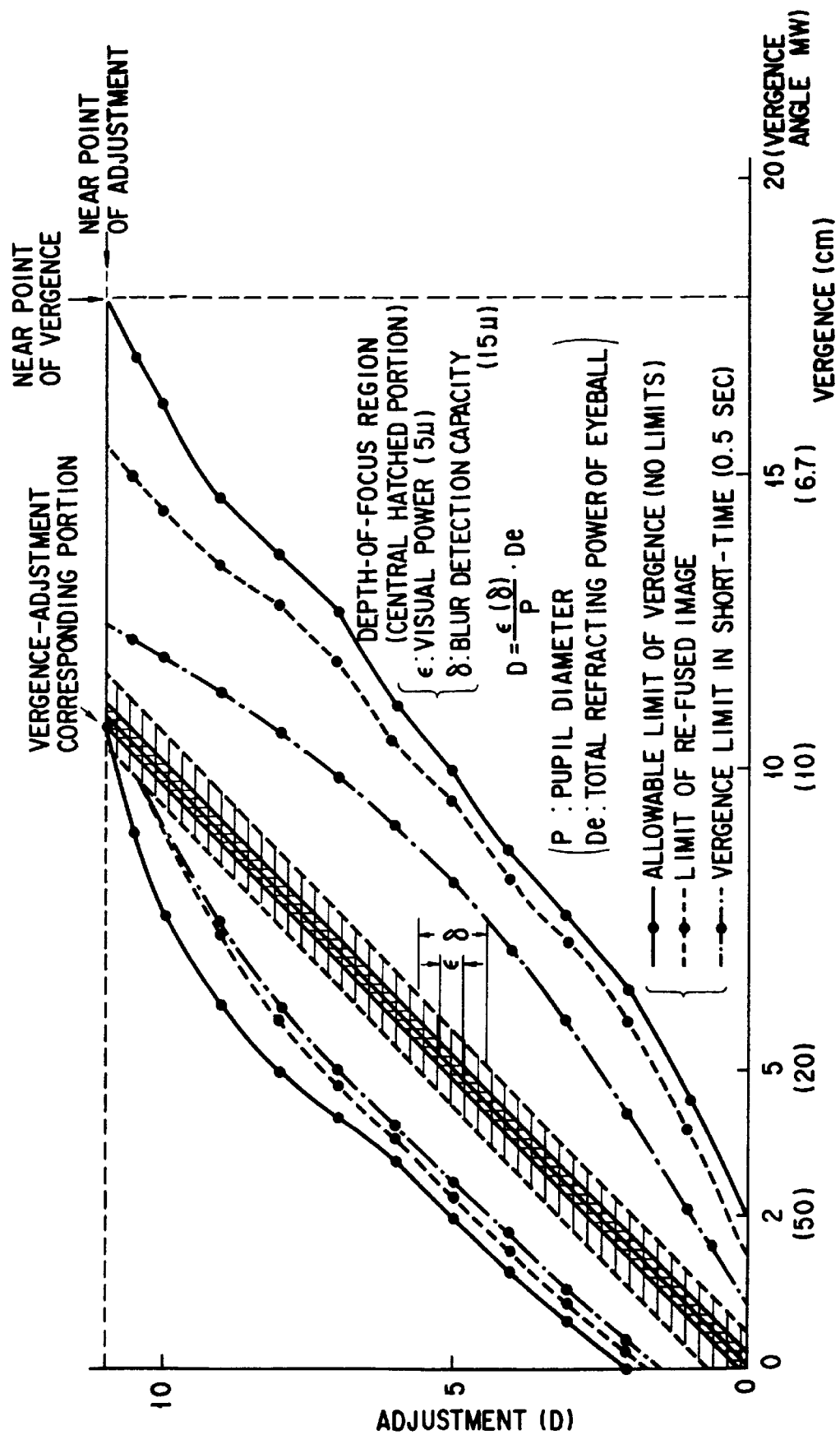
FIG. 5 is a graph for explaining a vergence-adjustment relationship and an allowance.

This condition can be derived from the "vergence-adjustment relationship and allowance" as shown in FIG. 5.

FIG. 5 is FIG. 138 on page 103 in "O plus E" No. 73, Co. Ltd. Shingijyutsu Communications, 1985, December, pp. 98–109, Seiri Kogaku (Physiology Optics) 15, Three-Dimensional Display, Toyohiko Hatada (Tokyo Kogei University, Department of Technology). The vergence is plotted along the abscissa, and adjustment (diopter) is plotted along the ordinate.

As can be apparent from FIG. 5, when the vergence falls within q2 diopter of the adjustment value, the vergence which causes fusion tends to occur.

In this case, equation (3) is differentiated with the diopter to obtain a condition which is satisfied by the horizontal displacement amount difference $(x_1-x_2)$ of the ball 2 as follows:

$$\frac{\partial(x_1 - x_2)}{\partial\left(\frac{1000}{L}\right)} = \frac{2d}{1000 \cdot \tan\theta} \quad (4)$$

(wherein the unit of distance is mm; this will apply to the following description).

When 4 (diopter) is multiplied with the right-hand side of equation (4), a change amount of the difference $(x_1-x_2)$ of the horizontal displacement amount of the ball 2 upon a change by 4 diopter is obtained.

Condition (5) is satisfied to make the change amount of the pop-up amount of the ball 2 fall within 4 diopter:

$$\Delta(x_1 - x_2) \leq \frac{8 \cdot d}{1000 \cdot \tan\theta} \quad (5)$$

That is, it is found that condition (5) is satisfied to suppress the change amount of the pop-up amount of the ball 2 serving as a target object within 4 diopter.

To make the pop-up amount of the ball 2 serving as the target object fall within q2 diopter centered on the visual range $L_{Base}$, condition (6) is satisfied:

$$\frac{2d}{1000} \cdot \left(\frac{1000}{L_{Base}} - 2\right) \cdot \frac{1}{\tan\theta} \leq (x_1 - x_2) \leq \frac{2d}{1000} \cdot \left(\frac{1000}{L_{Base}} + 2\right) \cdot \frac{1}{\tan\theta} \quad (6)$$

If visual range $L_{Base}$>500, then condition (6) or condition (6') may be satisfied:

$$\frac{2d}{1000} \cdot \left(\frac{1000}{L_{Base}} - 2\right) \cdot \frac{1}{\tan\theta} \leq (x_1 - x_2) \leq \frac{2d}{1000} \cdot \left(\frac{1000}{L_{Base}} + 2\right) \cdot \frac{1}{\tan\theta} \quad (6')$$

In this case, for example, if visual range $L_{Base}$=1000 (mm), then the pop-up amount of the ball 2 serving as the target object can be suppressed within the range of 500 (mm) to 2,000 (mm).

More preferably, a condition for allowing the pop-up amount of the ball 2 serving as the target object within q1 diopter centered on the visual range $L_{Base}$ will be described below.

In this case, as can be apparent from FIG. 5, when the vergence falls within q1 diopter of the adjustment value, the vergence which can be fused within a short period of time can be caused.

To make the change amount of the pop-up amount of the ball 2 fall within 2 diopter, condition (5') is satisfied:

$$\Delta(x_1 - x_2) \leq \frac{4 \cdot d}{1000 \cdot \tan\theta} \quad (5')$$

To suppress the change amount of the pop-up amount of the ball 2 serving as the target object fall within 2 diopter, it is found that condition (5') is satisfied.

To make the pop-up amount of the ball 2 serving as the target object fall within q1 diopter centered on the visual range $L_{Base}$, condition (6") is satisfied:

$$\frac{2d}{1000} \cdot \left(\frac{1000}{L_{Base}} - 1\right) \cdot \frac{1}{\tan\theta} \leq (x_1 - x_2) \leq \frac{2d}{1000} \cdot \left(\frac{1000}{L_{Base}} + 1\right) \cdot \frac{1}{\tan\theta} \quad (6'')$$

If visual range $L_{Base} > 1000$, then condition (6") or condition (6''') may be satisfied:

$$0 \leq (x_1 - x_2) \leq \frac{2d}{1000} \cdot \left(\frac{1000}{L_{Base}} + 1\right) \cdot \frac{1}{\tan\theta} \quad (6''')$$

The conditions for the stereoscopic images with which the observer can feel a sufficient stereoscopic impression while the changes in pop-up amount of the target object as an object to be gazed by the observer are kept small have been presented above.

According to the present invention, as described above, a change in pop-up amount of an object to be gazed by the observer can be reduced while the distance between an object to be gazed by the observer and another object is greatly changed.

There can be solved a conventional drawback (FIGS. 29A, 29B, and 29C) in which when a change in pop-up amount of an object to be gazed by an observer is reduced, the distance between the target object and any other object is undesirably reduced.

The preferred embodiments of the present invention based on the above general description will be described in detail with reference to the accompanying drawings.

Figure 6:
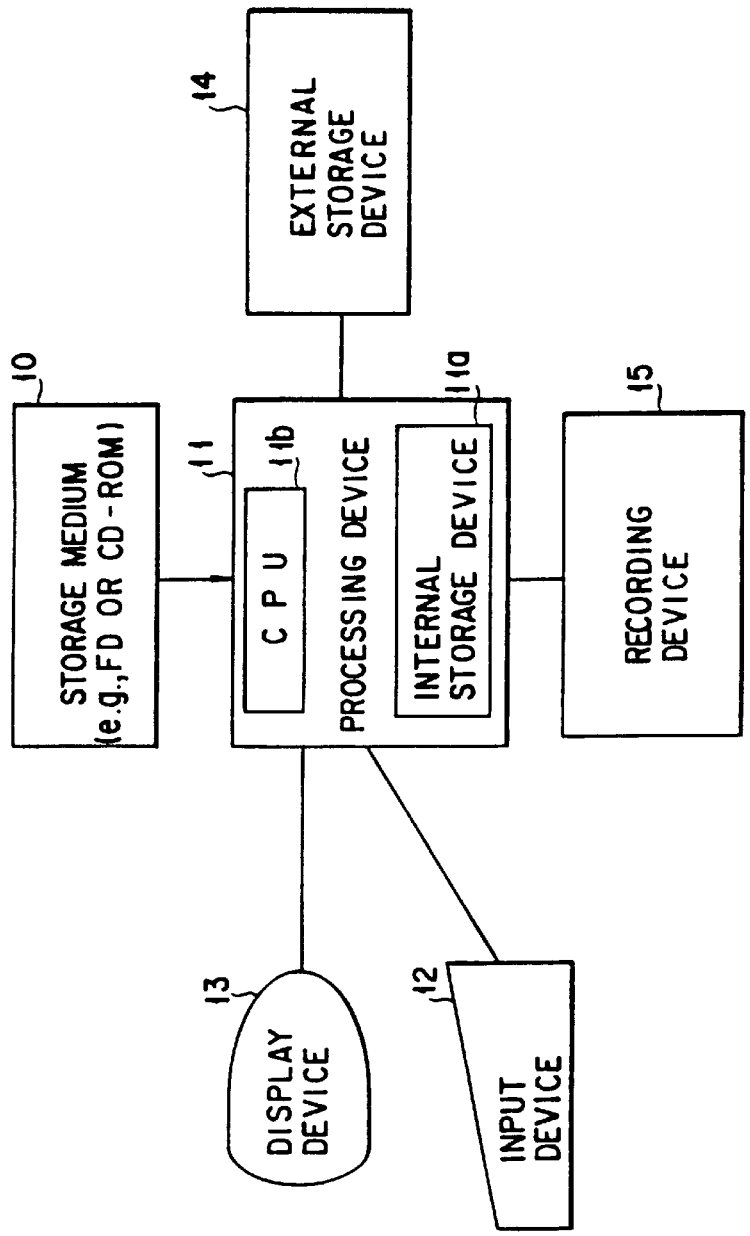
FIG. 6 is a block diagram showing the overall arrangement of a stereoscopic image generating apparatus according to the first embodiment of the present invention.

FIG. 6 is a view showing the overall arrangement of a stereoscopic image generating apparatus according to the first embodiment of the present invention. This stereoscopic image generating apparatus can also be applied to other embodiments.

The stereoscopic image generating apparatus shown in FIG. 6 comprises a processing device 11 such as a personal computer and peripheral devices connected to the processing device 11.

The peripheral devices are an input device 12 such as a keyboard or mouse for allowing an operator to input various data, a display device 13 for monitoring data input by the operator and generated images, an external storage device 14 for storing data input by the operator, and a recording device 15 for recording generated moving pictures.

The processing device 11 incorporates a central processing unit (CPU) 11b for performing predetermined calculations for generating stereoscopic images in accordance with CG (Computer Graphics) techniques and executing predetermined processing operations for the respective peripheral devices in accordance with computer readable program code means for executing a series of processing steps represented by flow charts (to be described later) and stored in a computer readable storage medium 10 such as an FD (Floppy Disk) or a CD-ROM mounted in the processing device 11. The processing device 11 also incorporates an internal storage device 11a for temporarily storing data.

The stereoscopic image generating apparatus of this embodiment generates left and right images (pictures) and then shifts them. The processing device 11 performs image editing to fix the vergence distance of the target object, i.e., fix the display position of the target object to a predetermined position after normal left and right images are generated.

FIG. 7 is a flow chart showing stereoscopic image generation processing executed by the processing device 11 according to the first embodiment.

Referring to FIG. 7, in steps 51 to 53, the processing device 11 stores, in the external storage device 14, the shape data, initial position data, and time movement data (motion data) of a plurality of objects which are input by the operator from the input device 12 such as a keyboard.

In step 54, the processing device 11 stores, in the external storage device 14, the position data, field angle data, and crossing angle (posture) data of left and right virtual cameras 4L and 4R which are input by the operator from the input device 12 such as a keyboard.

The distance between the positions of the left and right virtual cameras 4L and 4R is preferably set equal to the distance (e.g., 65 mm) between the eyeballs of an observer. The field angle and the crossing angle are preferably set equal to those of the eyepiece optical systems of an HMD used in stereoscopic image observation.

In step 55, the processing device 11 stores, in the external storage device 14, a target object (i.e., an object to be gazed by a CG designer) selected and set by the operator from the plurality of objects (instead, a specific point on an object may be selected and set).

As for the target object selected in step 55, the visual range is made to coincide with the vergence distance in the following processing. In this case, the target object is defined as a ball 2 in the following description.

In step 56, the processing device 11 stores, in the external storage device 14, visual range data (e.g., 1,000 mm) of the eyepiece optical systems of the HMD, which is input by the operator from the input device 12 such as a keyboard.

In step 57, the processing device 11 performs rendering on the basis of the data stored in steps 51 to 56 to generate left and right two-dimensional images (pictures) of the current frame photographed by the left and right virtual cameras 4L and 4R. The generated left and right images are temporarily stored in the internal storage device 11a.

Figure 28:
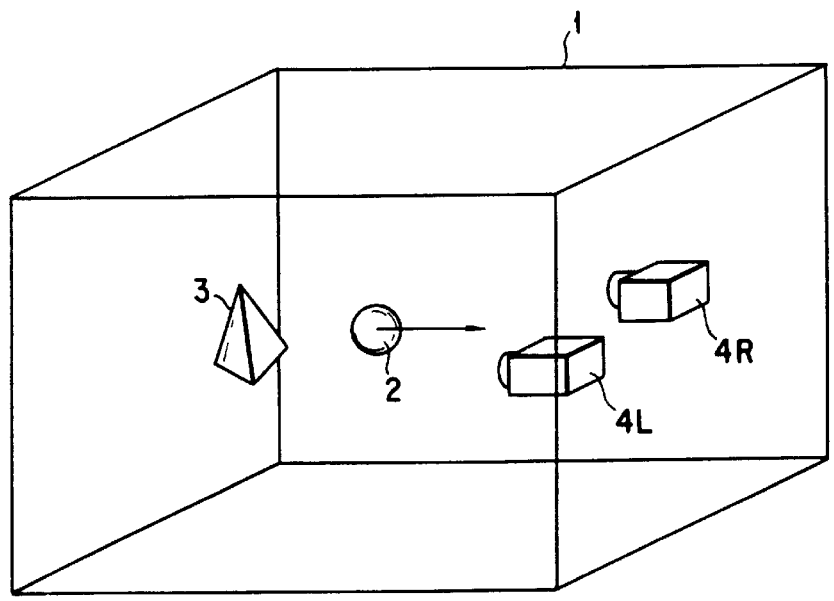
FIG. 28 is a view showing the arrangement state of objects and left and right virtual cameras in a virtual three-dimensional space in generating images.

This rendering is performed as in the conventional case, as shown in FIGS. 29A, 29B, and 29C. As shown in FIG. 28, for example, objects, i.e., the ball 2 and a trigonal pyramid 3, located in a virtual three-dimensional space 1 are photographed with the left and right virtual cameras 4L and 4R located in the same space as that of the objects, thereby obtaining the left and right images.

Figures 8A, 8B:
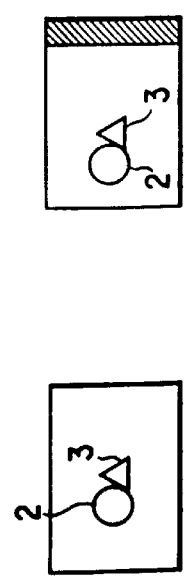
FIGS. 8A and 8B are views illustrating images generated in the first embodiment.

For example, an image shown in FIG. 8A is generated by this rendering.

The left and right images generated by the above rendering must be obtained so that at least one object whose size changes with time and at least another object (this object may be an object whose size changes or does not change with time) are rendered in an image with a parallax. Two or more objects are included in the image.

In step 58, the processing device 11 calculates a distance $L_{obj}$ (see FIG. 4) from the ball 2 serving as the target object in the current frame to each of the viewpoints of each of the left and right virtual cameras 4L and 4R on the basis of the data stored in steps 51 to 57. In step 59, the processing device 11 calculates a shift amount S for a horizontal movement (shift) of the entire left and right images from the centers of the images in units of pixels in accordance with equation (7) below:

$$S = \frac{d}{1000} \cdot \left(\frac{1000}{L_{obj}} - \frac{1000}{L_{Base}}\right) \cdot \frac{P_{H-half}}{\tan\theta} \quad (7)$$

where d is the distance (positive on the right viewpoint side and negative on the left viewpoint side) from the middle point (see FIG. 4) between the viewpoints of the left and right virtual cameras 4L and 4R to each of the left and right viewpoints, $L_{obj}$ is the distance (vergence distance) from the center of the target object to each of the left and right viewpoints in the direction of depth, $L_{Base}$ is the visual range determined by each eyepiece optical system of the HMD, $\theta$ is the horizontal half field angle of the camera, and $P_{H-half}$ is the value of the half of the number of horizontal pixels of one image.

A positive shift amount S represents a shift of the entire image to the right, and a negative shift amount S represents a shift of the entire image to the left.

A practical example of the shift amount S is as follows.

For example, assume d=32 (mm), $L_{Base}$=1000 (mm), $\theta$=24.2, and $P_{H-half}$=320. In this case, if $L_{obj}$=500 (mm), then only 23 pixels in the right image are shifted to the right, and only 23 pixels in the left image are shifted to the left.

If $L_{obj}$=2000 (mm), then only 10 pixels in the right image are shifted to the left, and only 10 pixels in the left image are shifted to the right.

The coincidence accuracy between the visual range $L_{Base}$ and the vergence distance $L_{obj}$ within q2 diopter is allowed.

This can be derived from the "vergence-adjustment relationship and allowance" shown in FIG. 5.

As can be apparent from FIG. 5, the vergence falling within q2 diopter of the adjustment value results in the vergence which tends to be fused.

For this purpose, condition (8) must be satisfied:

$$\frac{d}{1000} \cdot \left(\frac{1000}{L_{obj}} - \frac{1000}{L_{Base}} - 2\right) \cdot \frac{P_{H-half}}{\tan\theta} < S < \frac{d}{1000} \cdot \qquad (8)$$

$$\left(\frac{1000}{L_{obj}} - \frac{1000}{L_{Base}} + 2\right) \cdot \frac{P_{H-half}}{\tan\theta}$$

In condition (8), d, $L_{obj}$, and $L_{Base}$ are expressed in mm.

If $L_{Base}$>500, then condition (8) or condition (9) may be satisfied.

$$\frac{d}{1000} \cdot \left(\frac{1000}{L_{obj}} - \frac{2000}{L_{Base}}\right) \cdot \frac{P_{H-half}}{\tan\theta} < S < \frac{d}{1000} \cdot \qquad (9)$$

$$\left(\frac{1000}{L_{obj}} - \frac{500}{L_{Base}}\right) \cdot \frac{P_{H-half}}{\tan\theta}$$

More specifically, the coincidence accuracy between the visual range $L_{Base}$ and the vergence distance $L_{obj}$ is allowed within q1 diopter.

In this case, as can be apparent from FIG. 5, the vergence which can be fused within a short period of time can occur.

For this purpose, condition (8') must be satisfied:

$$\frac{d}{1000} \cdot \left(\frac{1000}{L_{obj}} - \frac{1000}{L_{Base}} - 1\right) \cdot \frac{P_{H-half}}{\tan\theta} < S < \frac{d}{1000} \cdot \qquad (8')$$

$$\left(\frac{1000}{L_{obj}} - \frac{1000}{L_{Base}} + 1\right) \cdot \frac{P_{H-half}}{\tan\theta}$$

If $L_{Base}$>1000, then condition (8') or condition (8") may be satisfied:

$$\frac{d}{1000} \cdot \left(\frac{1000}{L_{obj}} - \frac{1000}{L_{Base}} - 1\right) \cdot \frac{P_{H-half}}{\tan\theta} < S < \frac{d}{1000} \cdot \left(\frac{1000}{L_{obj}}\right) \cdot \frac{P_{H-half}}{\tan\theta} \qquad (8'')$$

Referring to FIG. 7, the processing device 11 horizontally shifts the image of FIG. 8A by the shift amount S obtained in step 59 to generate new left and right images in step 60.

These new left and right images include a black display portion as a blank portion (right end portion) as a result of the shift of the entire image of FIG. 8A to the left, as shown in FIG. 8B.

The shifted left and right image array data are stored in the external storage device 14 by the processing device 11.

In step 61, the processing device 11 determines whether the currently processed frame is the final frame. The processing device 11 repeats the loop processing of NO of step 61, step 57, step 58, step 59, step 60, and step 61 until processing of the final frame is completed.

In step 62, the processing device 11 reads out the left image array data from the external storage device 14 and records the left image array data as a left eye moving picture on a recording medium such as a video tape using the image recording device 15 such as a video deck.

In step 63, the processing device 11 reads out the right image array data from the external storage device 14 and records the right image array data as a right eye moving picture on a recording medium such as a video tape using the image recording device 15 such as a video deck.

When a series of processing operations described above are completed, the left and right moving picture array data are generated.

The left and right images represented by these moving picture array data are the ones horizontally shifted by the shift amount S satisfying equation (7) or condition (8) or (9). As a result, these images can be displayed on the HMD or the like as images satisfying equation (3) or condition (5), (6), or (6').

When the images are horizontally shifted by the shift amount S satisfying condition (8') or (8"), the resultant images can be displayed on the HMD as images satisfying condition (5'), (6"), or (6''').

The examples of the left and right images are shown in FIGS. 1A, 1B, and 1C.

These left and right images are obtained such that the ball 2 serving as an object whose size changes with time and the trigonal pyramid 3 serving as an object whose size does not change with time are rendered in an image with a parallax. In the images of FIGS. 1A, 1B, and 1C, the horizontal positional relationship between the ball 2 and the trigonal pyramid 3 changes with time.

Figure 3:
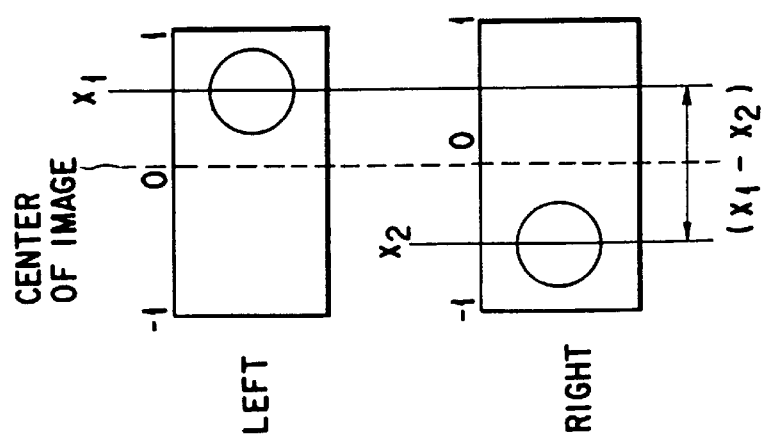
FIG. 3 is a view for explaining the arrangement state of a specific object in the images generated by the stereoscopic image generating apparatus of the present invention.

When a change from FIG. 1A to FIG. 1B and a change from FIG. 1B to FIG. 1C are analyzed, the object is horizontally shifted such that the difference between the horizontal displacement amount of the ball 2 from the center of the left image and the horizontal displacement amount of the ball 2 from the center of the right image, i.e., the difference $(x_1-x_2)$ in FIG. 3, is substantially constant (the vergence distance of the ball 2 in stereoscopic observation is fixed accordingly).

The trigonal pyramid 3 is horizontally shifted with respect to the ball 2 with a change in size of the ball 2. That is, the trigonal pyramid 3 is horizontally shifted to change the difference between the horizontal displacement amount of the trigonal pyramid 3 from the center of the left image and the horizontal displacement amount of the trigonal pyramid 3 from the center of the right image.

Figure 9:
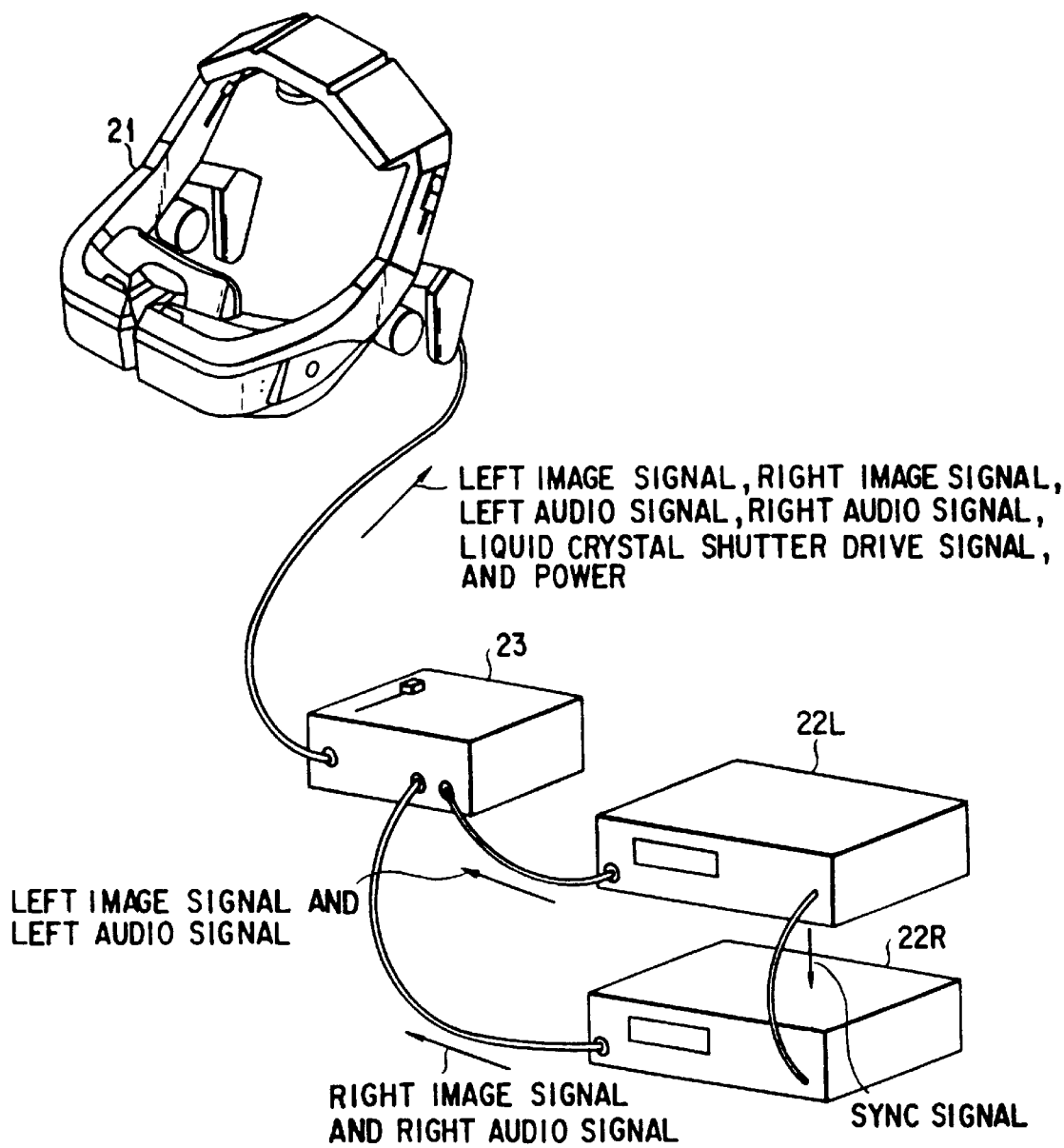
FIG. 9 is a view for explaining an observation arrangement for a stereoscopic image generated in the first embodiment.

An observation arrangement for the stereoscopic image obtained as described above will be described with reference to FIG. 9.

In this case, a stereoscopic image is observed with an HMD 21.

The video tapes on which the generated left and right moving pictures are inserted in a left image reproduction device 22L and a right image reproduction device 22R and are reproduced.

In this case, sync signals are supplied to the left and right image reproduction devices 22L and 22R to synchronously reproduce the images. A left image signal and a left audio signal are input from the left image reproduction device 22L to an HMD control box 23.

A right image signal and a right audio signal are input from the right image reproduction device 22R to the HMD control box 23.

The HMD control box 23 supplies the left image and audio signals and the right image and audio signals to the HMD 21 and supplies power to a drive circuit for a liquid crystal display (LCD) of the HMD 21. The HMD control box 23 also supplies a liquid crystal shutter drive signal for driving a liquid crystal shutter for switching between shielding and transmission of an external image.

The HMD control box 23 can adjust the audio volume level of headphones arranged in the HMD 21.

The left image signal in the HMD 21 is displayed on the left LCD, enlarged by the left eyepiece optical system, and projected on the left eyeball of the observer.

The right image signal is displayed on the right LCD, enlarged by the right eyepiece optical system, and projected on the right eyeball of the observer.

The visual range of each of the left and right eyepiece optical systems of the HMD 21 is set equal to that set in step 56 of the flow chart in FIG. 7.

According to the stereoscopic image generating apparatus of this embodiment, since the visual range always coincides with the vergence distance for the target object desired by the CG designer and set in step 55 of the flow chart in FIG. 7, the focusing action of the eyeballs of the observer is properly effected when the observer gazes the target object. Therefore, the focusing position of the observer always coincides with the position of the two-eye vergence.

A description will be made using the practical examples of left and right images.

As shown in FIG. 28, when the ball 2, the trigonal pyramid 3, and left and right virtual cameras 4L and 4R are located in the virtual three-dimensional space 1, and only the ball 2 is moved to come close to the left and right virtual cameras 4L and 4R, as indicated by the arrow, the resultant left and right images are shown in, e.g., FIGS. 1A, 1B, and 1C.

When the images in FIGS. 1A, 1B, and 1C are displayed with the HMD 21 in the order named, the stereoscopic space represented by the HMD can be seen, as shown in, e.g., FIG. 2.

More specifically, the ball 2 is enlarged with time, but the distance (vergence distance) between the ball 2 and the eyeballs of the observer does not change. The display position is therefore fixed.

On the other hand, although the size of the trigonal pyramid 3 does not change with time, the trigonal pyramid 3 is separated with time from the eyeballs of the observer with time, as indicated by the arrow in FIG. 2.

According to this embodiment, as in the conventional case shown in FIGS. 29A, 29B, 29C, and 30, although the distance between the ball 2 and the trigonal pyramid 3 increases with time, the distance between the ball 2 and the eyeballs does not change.

The human visual sensitivity in which "the human eye is sensitive to a change in relative distance, but is not sensitive to detection of an absolute distance" is utilized, so that the observer sees the ball 2 as if it were coming close to the eyeballs and the trigonal pyramid 3 as if it were kept stopped.

According to the present invention, therefore, an image can present a sufficient stereoscopic impression to the observer without rarely changing the pop-up amount of the ball 2.

As shown in FIG. 10, assuming that the ball 2, the trigonal pyramid 3, and left and right virtual cameras 4L and 4R are located in the virtual three-dimensional space 1, that the ball 2 is moved to come close to the left and right virtual cameras 4L and 4R, as indicated by the arrow in FIG. 10, and that the trigonal pyramid 3 is separated from the left and right virtual cameras 4L and 4R, as indicated by the arrow in FIG. 10, the resultant left and right images are shown in, e.g., FIGS. 11A, 11B, and 11C.

When the images in FIGS. 11A, 11B, and 11C are displayed with the HMD 21 in the order named, the ball 2 is enlarged with time, but the distance (vergence distance) for the eyeballs does not change with time. Therefore, the display position is fixed.

In this case, note that the vergence angle of the ball 2 is also fixed.

The trigonal pyramid 3 is reduced with time and is separated from the eyeballs.

At this time, in accordance with the human visual function described above, the observer observes the ball 2 as if it were coming close to the eyeballs, and the trigonal pyramid 3 as if it were separated from the eyeballs.

According to this embodiment, an image having a sufficient stereoscopic impression can be presented without rarely changing the pop-up amount of the ball 2.

The conventionally generated left and right images using the settings in FIG. 10 are shown in FIGS. 31A, 31B, and 31C.

When the conventionally generated left and right images are displayed with the HMD 21 in the order of FIGS. 31A, 31B, and 31C, as in this embodiment, the observer sees the ball 2 as if it were coming close to the eyeballs and the trigonal pyramid 3 as if it were separated from the eyeballs. However, the conventional case is different from this embodiment in that the display position of the ball 2 is not fixed but is shifted toward the eyeballs.

As shown in FIG. 12, when the ball 2, the trigonal pyramid 3, and the left and right virtual cameras 4L and 4R are located in the virtual three-dimensional space 1, and only the ball 2 is obliquely moved to come close to the left and right virtual cameras 4L and 4R, as indicated by an arrow in FIG. 12, the left and right images generated in this embodiment are shown in, e.g., FIGS. 13A, 13B, and 13C.

When these left and right images are displayed with the HMD 21 in the order of FIGS. 13A, 13B, and 13C, the stereoscopic space represented by the HMD can be seen as shown in FIG. 14.

That is, the ball 2 is enlarged with time and is shifted horizontally with time while the distance (vergence distance) between the ball 2 and the eyeballs does not almost change.

In this case, as shown in FIGS. 15A, 15B, and 15C in which the array of images in FIGS. 13A, 13B, and 13C is rotated 90× clockwise, although the positions of the ball 2 in the respective images are changed, the difference $(x_1-x_2)$ between the horizontal displacement amount of the ball 2 from the left image and the horizontal displacement amount of the ball 2 from the center of the right image changes within only the range defined by condition (6) or (6'), and is substantially constant.

On the other hand, although the trigonal pyramid 3 is separated with time from the eyeballs, its size does not change.

In this case, in accordance with the human visual function described above, the observer observes the ball 2 as if it were coming close to the eyeballs, and the trigonal pyramid 3 as if it were separated from the eyeballs.

According to this embodiment, an image having a sufficient stereoscopic impression can be presented without rarely changing the pop-up amount of the ball 2.

The conventionally generated left and right images using the settings in FIG. 12 are shown in FIGS. 32A, 32B, and 32C.

When the conventionally generated left and right images are displayed with the HMD 21 in the order of FIGS. 32A, 32B, and 32C, the stereoscopic space represented by the HMD can be seen as shown in FIG. 33.

That is, in the conventionally generated left and right images as in this embodiment, the observer sees the ball 2 as if it were coming close to the eyeballs and the trigonal pyramid 3 as if it were separated from the eyeballs. However, the conventional case is different from this embodiment in that the difference ($x_1-x_2$) increases with a change in image in the order of FIGS. 32A, 32B, and 32C.

As described above, according to this embodiment, a stereoscopic image in which the vergence distance $L_{obj}$ of the target object is fixed can be generated.

This stereoscopic image can be more easily observed because the vergence distance $L_{obj}$ is made to coincide with the visual range $L_{Base}$.

Figure 34:
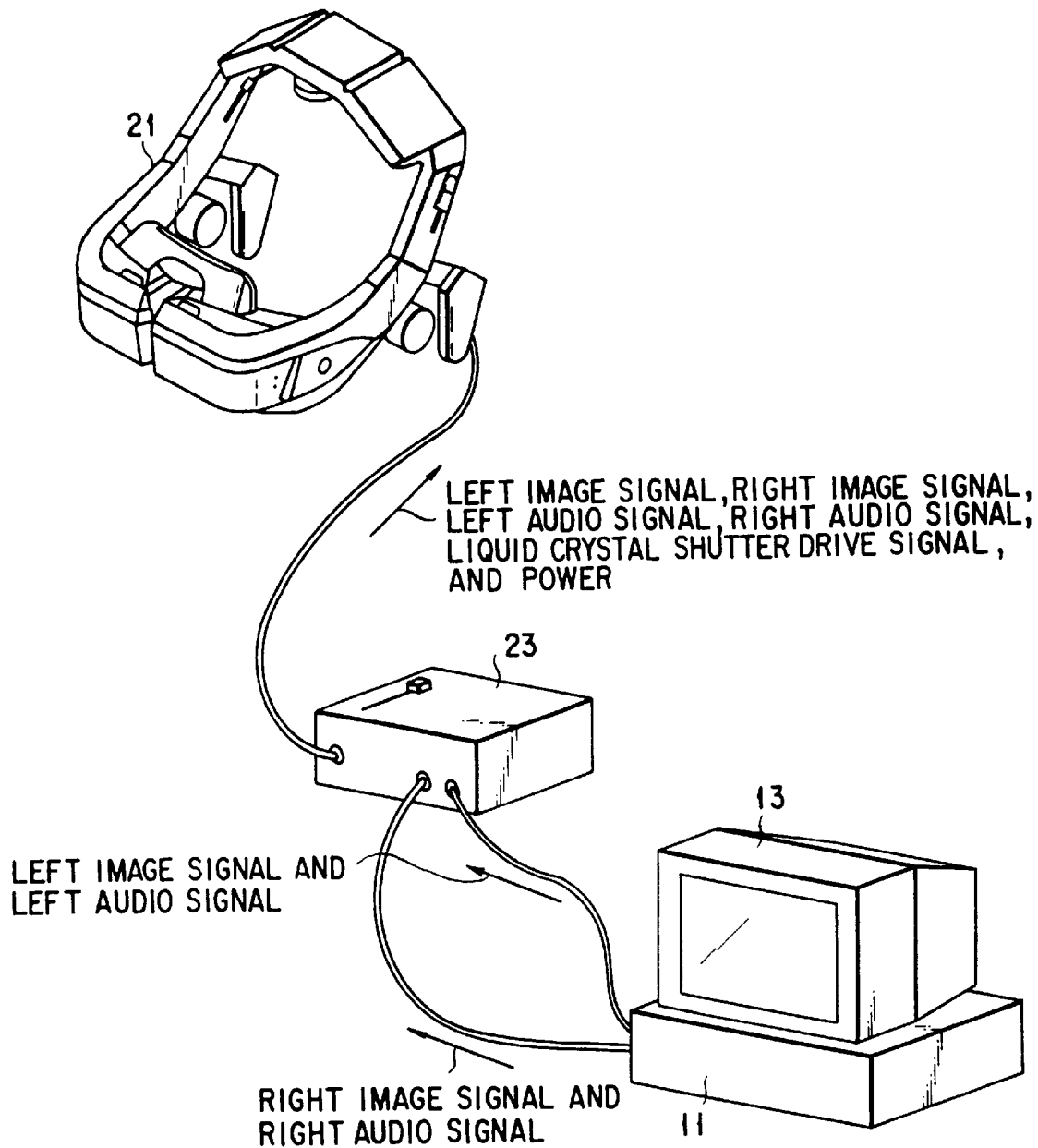
FIG. 34 is a view for explaining an observation arrangement for a stereoscopic image generated in the first embodiment.

As shown in FIG. 34, as an observation example with the HMD 21, a stereoscopic image generated by the processing device 11 may be directly observed with the HMD 21 without any mediacy of the recording device 15.

In this case, an image stored without any shift in step 60 of the flow chart in FIG. 7 may be directly output to the HMD 21.

FIGS. 16A, 16B, 16C, and 16D are views showing images generated in stereoscopic image generation processing according to the second embodiment of the present invention.

In this embodiment, an image is generated at the field angle of a camera larger than that of an HMD, the resultant image is shifted in the same manner as in the first embodiment, and an image portion corresponding to the field angle of the HMD is extracted.

In this embodiment, a stereoscopic image generating apparatus identical to that of the first embodiment shown in FIG. 6 is used.

In this embodiment, a processing device 11 performs stereoscopic image generation processing in accordance with the flow chart of FIG. 7 in the same manner as in the first embodiment. The contents of the first embodiment are partially changed.

More specifically, in step 54 of the flow chart in FIG. 7, the field angle of each of the left and right virtual cameras 4L and 4R is set larger than that of the corresponding eyepiece optical system of an HMD 21.

An image generated in processing of step 54 is shown in, e.g., FIG. 16A. Objects are smaller than those of the image (FIG. 8A) of the first embodiment by an increase in field angle.

The image in FIG. 16A is shifted in the same manner as in the first embodiment in step 60 of FIG. 7 to obtain an image shown in FIG. 16B. In step 60 of this embodiment, after the image is shifted, image area extraction processing by the field angle of the eyepiece optical system of the HMD 21, as shown in FIG. 16C, and enlargement processing, as shown in FIG. 16D are performed by the processing device 11.

In addition to the function and effect of the first embodiment, the second embodiment can obtain the function and effect in which the entire image can be displayed without leaving the black portion at the edge of the image as in the image (FIG. 8B) of the first embodiment.

Figure 17:
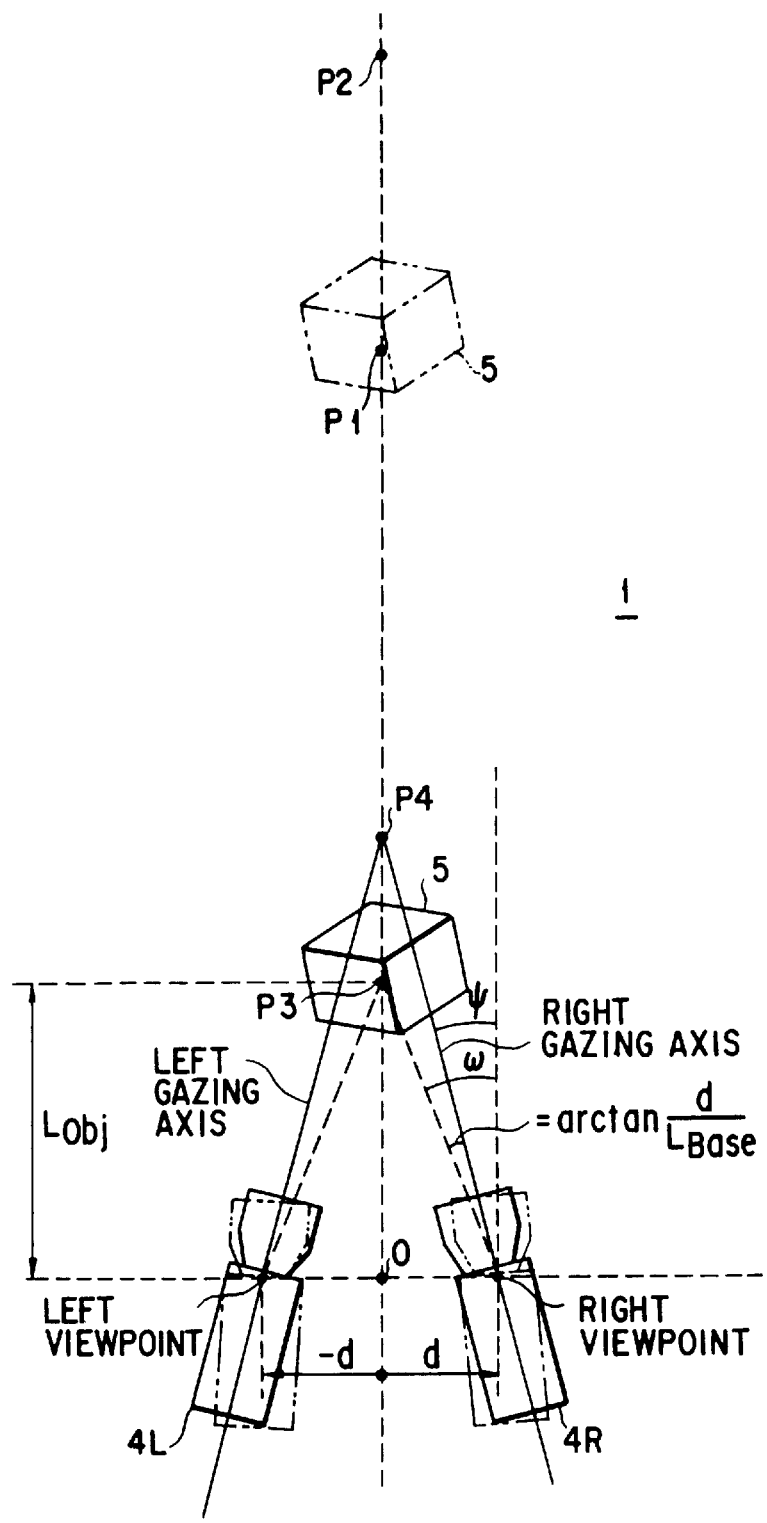
FIG. 17 is a view for explaining images generated in stereoscopic image generation processing of the third embodiment of the present invention on the basis of the positional relationship between the object and the left and right virtual cameras in the virtual three-dimensional space.

FIG. 17 is a view for explaining images generated in stereoscopic image generation processing of the third embodiment of the present invention on the basis of the positional relationship between objects and left and right virtual cameras in a virtual three-dimensional space.

In this embodiment, as shown in FIG. 17, assume that a cube 5 serving as a target object, and left and right virtual cameras 4L and 4R are located in a virtual three-dimensional space 1, and that the vergence distance of the target object 5 is kept constant when the target object 5 is moved to come close to the left and right virtual cameras 4L and 4R. In this case, the gazing directions (illustrated left and right gazing axes) of the virtual cameras 4L and 4R are inclined in accordance with a distance $L_{obj}$ from the target object 5 to the viewpoint of each of the left and right virtual cameras 4L and 4R.

More specifically, when the target object 5 is located at the position of coordinates P1, the gazing point of the left and right virtual cameras 4L and 4R is set to coordinates P2.

When the target object 5 comes closer to be located at the position indicated by coordinates P3, the gazing point of the left and right cameras comes closer to and is set at coordinates P4.

As described above, the gazing directions of the left and right virtual cameras 4L and 4R are changed to fix the vergence distance of the target object 5.

At this time, a gazing direction angle ψ of the left or right virtual camera is an angle (ψ=ω−m) obtained by subtracting a fixed angle m from an angle ω between the right or left viewpoint and a line segment obtained by connecting the left or right viewpoint to the target object 5. The angle ψ is expressed by equation (10) below:

$$\Psi = \omega - \phi = \omega - \arctan\frac{d}{L_{Base}} \tag{10}$$

where d is the distance between the left or right viewpoint and the middle point between the left and right points of the left and right virtual cameras 4L and 4R, and $L_{Base}$ is the visual range.

For example, if d=32, and $L_{Base}$=1000 in equation (10), then the fixed angle m=1.8 degrees.

In this embodiment, the coincidence accuracy between the visual range and the vergence distance is allowed within q2 diopter as in the first embodiment.

In this case, equation (10) is rewritten as condition (11) as follows:

$$\omega - \arctan\left[\frac{d}{1000} \cdot \left\{\frac{1000}{L_{Base}} + 2\right\}\right] < \Psi < \omega - \arctan\left[\frac{d}{1000} \cdot \left\{\frac{1000}{L_{Base}} - 2\right\}\right] \tag{11}$$

If $L_{Base}$>500, it may be satisfied above condition (11) or following condition (11)'.

$$\omega - \arctan\left[\frac{d}{1000} \cdot \left\{\frac{2000}{L_{Base}}\right\}\right] < \Psi < \omega - \arctan\left[\frac{d}{1000} \cdot \left\{\frac{500}{L_{Base}}\right\}\right] \tag{11'}$$

The angle ω is represented by equation (11A) as follows:

$$\omega = \arctan\frac{d}{L_{obj}} \tag{11A}$$

More preferably, when the coincidence accuracy between the visual distance and the vergence distance is allowed within q1 diopter, the following condition (11B) is established:

$$\omega - \arctan\left[\frac{d}{1000} \cdot \left\{\frac{1000}{L_{Base}} + 1\right\}\right] < \Psi < \omega - \qquad (11B)$$

$$\arctan\left[\frac{d}{1000} \cdot \left\{\frac{1000}{L_{Base}} - 1\right\}\right].$$

If $L_{Base} > 1000$, then condition (11C) is established:

$$\omega - \arctan\left[\frac{d}{1000} \cdot \left\{\frac{1000}{L_{Base}} + 1\right\}\right] < \Psi < \omega \qquad (11C)$$

A processing device 11 independently calculates the gazing directions of the left and right virtual cameras 4L and 4R.

Figure 18:
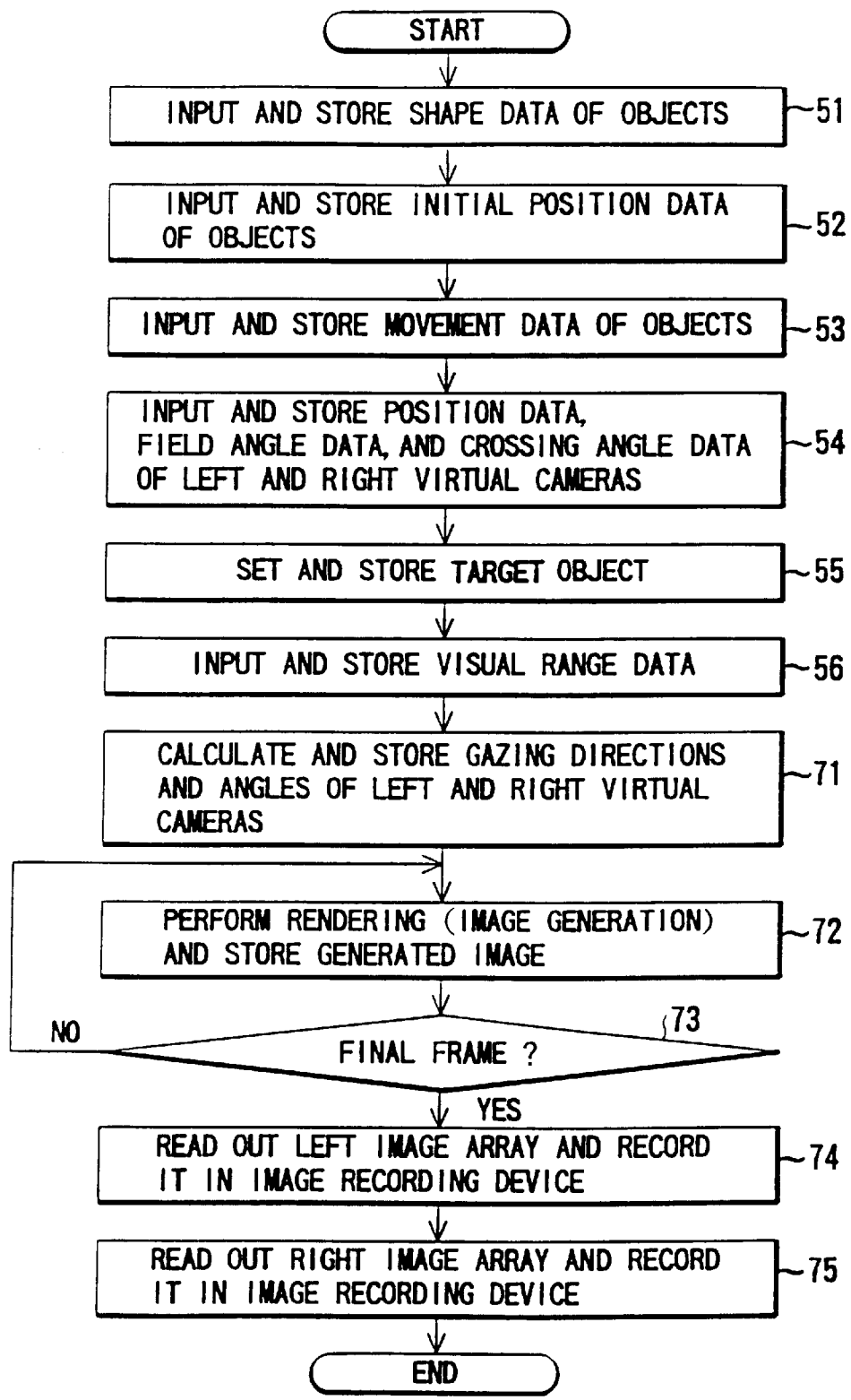
FIG. 18 is a flow chart showing stereoscopic image generation processing executed by a processing device according to the third embodiment.

FIG. 18 is a flow chart showing stereoscopic image generation processing executed by the processing device 11 in FIG. 6 according to the third embodiment. Steps 51 to 56 are identical to those of the first embodiment in FIG. 7, and a detailed description thereof will be omitted (note that step 54 of the third embodiment does not use a crossing angle).

In step 71, the processing device 11 reads out the data stored in steps 51 to 56, and equation (10) or condition (11) or (11') is calculated to obtain the gazing direction angles (representing the movements of the left and right virtual cameras in the gazing directions) ψ of the left and right virtual cameras 4L and 4R. The gazing direction angle data are stored in an external storage device 14.

In steps 72 and 73, the processing device 11 performs normal rendering for all the left and right frames as in the first embodiment, and stores the generated left and right images frame by frame in the external storage device 14.

In steps 74 and 75, the processing device 11 reads out the left and right image array data from the external storage device 14 as in steps 62 and 63 of the first embodiment. The processing device 11 records the left and right image array data as left and right moving pictures on a recording medium such as a video tape using an image recording device 15 such as a video deck.

By the above series of processing operations, according to this embodiment, a stereoscopic image whose vergence distance (a vergence angle when the target object moves along a line segment parallel to a perpendicular bisector of the viewpoints of the left and right virtual cameras 4L and 4R, as shown in FIG. 17) of the target object is fixed can be finally generated.

According to this embodiment, since the vergence distance is made to coincide with the visual range, a more easily observed image can be presented to the observer.

According to this embodiment, the processing speed can be advantageously increased by an image shift operation of the first and second embodiments.

FIG. 19 is a view for explaining the principle of stereoscopic image generation processing according to the fourth embodiment of the present invention.

According to the first to third embodiments, the left and right images are so generated as to prevent a change in pop-up amount regardless of the movement of the target object in a direction to come close to or separate from the eyeballs. With this arrangement, when only a single object is moved without any background, the size of the image is simply changed, but a magnitude in the direction of depth does not change, thereby impairing the stereoscopic impression.

This embodiment gives a limited change within the narrow range of pop-up amounts of the target object.

According to this embodiment, this range is limited to the area centered on the visual range, thereby generating a more easily observed image.

FIG. 19 shows the relationship between $1000/L_{obj}$ (to be referred to original vergence hereinafter) as a value obtained by multiplying the reciprocal of the distance from the target object to the virtual camera in the direction of width with 1,000 and $1000/L_{Tag}$ (to be referred to as converted vergence hereinafter) obtained upon image conversion such as a shift.

When the original vergence changes within the range from a minimum value α to a maximum value β, the converted vergence is proportional to the original vergence and changes within the range (indicated by a hatched region) of q2 diopter centered on (1000/visual range $L_{Base}$). A change amount of the converted vergence is 2γ (for 0≦γ<2 and γ ≦ $1000/L_{Base}$).

Figures 20A, 20B:
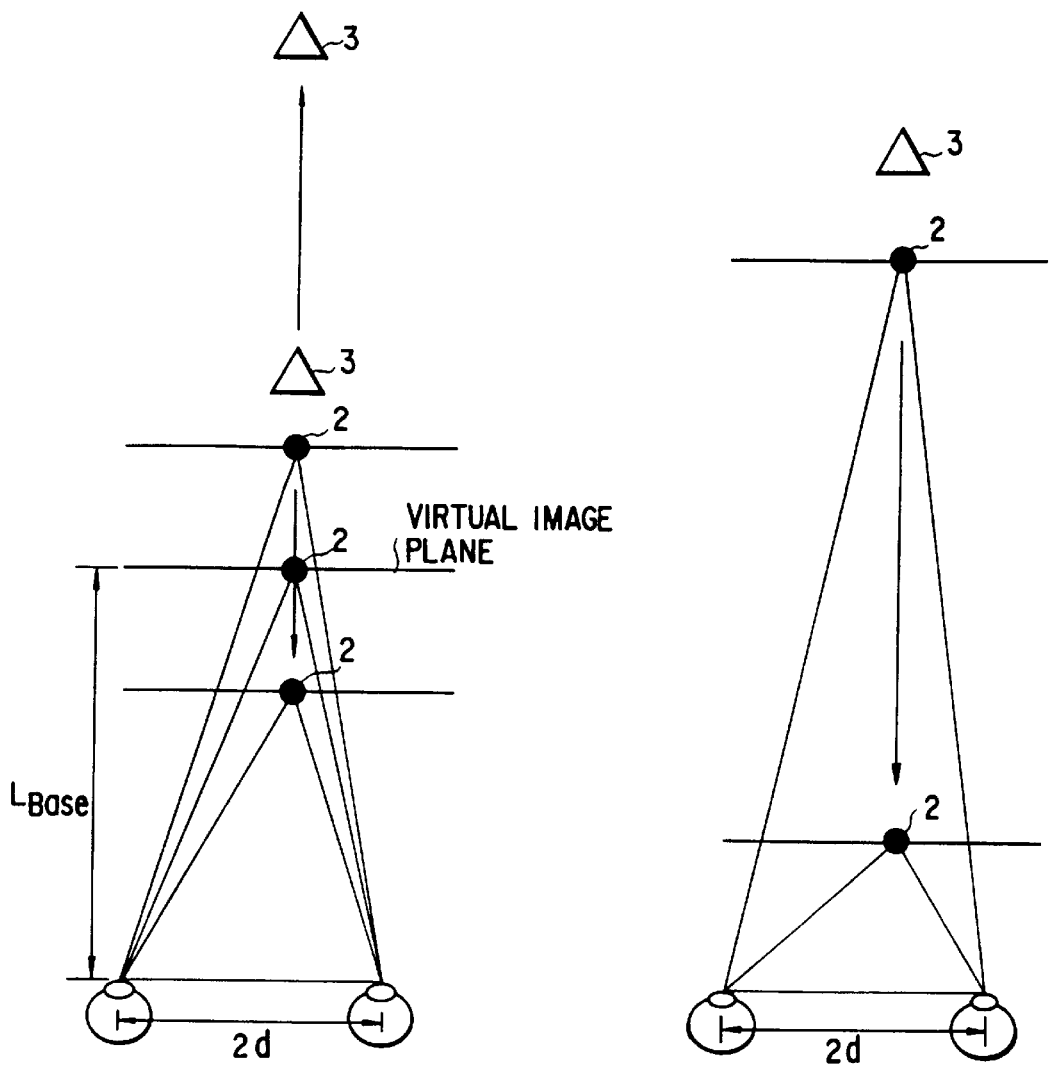
FIGS. 20A and 20B are views for explaining how objects in the images are seen when the images are observed in the fourth embodiment and the conventional case, respectively.

At this time, the distance of a ball 2 serving as a target object in the direction of depth is converted, as shown in FIG. 20A. The observer observes the target object as if the visual range were changed near (i.e., the range of q2 diopter) the visual range $L_{Base}$.

The relative distance between the target object 2 and an object 3 (an illustrated trigonal pyramid) except for the target object 2 changes in the same manner as in the conventional case. For this reason, the movements of both the objects can be stereoscopically observed as in the conventional case.

When a stereoscopic image is generated by a conventional method, an object can be seen such that the distance of the target object in the direction of depth greatly changes from a large distance to a small distance, as shown in FIG. 20B.

The relationship between the original vergence and the converted vergence is expressed by equation (12) as follows.

$$\frac{1000}{L_{Tag}} = \frac{2\gamma}{\beta - \alpha} \cdot \frac{1000}{L_{obj}} + \frac{1000}{L_{Base}} - \frac{\gamma(\alpha + \beta)}{\beta - \alpha} \qquad (12)$$

If $L_{Base} > 500$, it may be satisfied above equation (12) or following equation (12')

$$\frac{1000}{L_{Tag}} = \frac{1}{\beta - \alpha} \cdot \left(\frac{1000}{L_{Base}} + \gamma\right) \cdot \left(\frac{1000}{L_{obj}} - \alpha\right) \qquad (12')$$

A substitution of the resultant $1/L_{Tag}$ into equation (13) yields a shift amount S:

$$S = \frac{d}{1000} \cdot \left(\frac{1000}{L_{obj}} - \frac{1000}{L_{Tag}}\right) \cdot \frac{P_{H-half}}{\tan\theta} \qquad (13)$$

Equation (13) is obtained by replacing $L_{Base}$ of equation (7) with $L_{Tag}$.

In equation (13), d is the distance between the left or right viewpoint and the middle point O of the left and right viewpoints of the left and right virtual cameras 4L and 4R. The distance d on the right viewpoint side is represented by +d, whereas the distance d on the left viewpoint side is represented by −d.

$L_{obj}$ is the distance (vergence distance) from the center of the target object to the left or right viewpoint in the direction of depth, θ is the horizontal half field angle of the left or right virtual camera, and $P_{H-half}$ is the half of the number of horizontal pixels of one image.

A positive shift amount S represents the shift of the entire image to the right, and a negative shift amount S represents the shift of the entire image to the left.

A practical example of the shift amount S is shown below.

For example, assume $L_{Base}$=1000, d=32, θ=24, 2, $P_{H-half}$= 320, γ=1, minimum value α of $L_{obj}$=0.25 (=1000/4000), and maximum value β of $L_{obj}$=4 (=1000/250). In this case, if $L_{obj}$=500, then only 25 pixels in the right image are shifted to the right, and only 25 pixels in the left images are shifted to the left in accordance with equations (12) and (13).

If $L_{obj}$=2000, then only eight pixels in the right image are shifted to the right, and only eight pixels in the left image are shifted to the left.

A tolerance corresponding to the depth of field of the eyeball can be allowed in equation (13).

In consideration of FIG. 5, equation (13) can be rewritten as condition (14) below:

$$\frac{d}{1000} \cdot \left(\frac{1000}{L_{obj}} - \frac{1000}{L_{Tag}} - 1\right) \cdot \frac{P_{H-half}}{\tan\theta} < S < \frac{d}{1000} \cdot \left(\frac{1000}{L_{obj}} - \frac{1000}{L_{Tag}} + 1\right) \cdot \frac{P_{H-half}}{\tan\theta} \quad (14)$$

Stereoscopic image generation processing of this embodiment will be described below.

Figure 21:
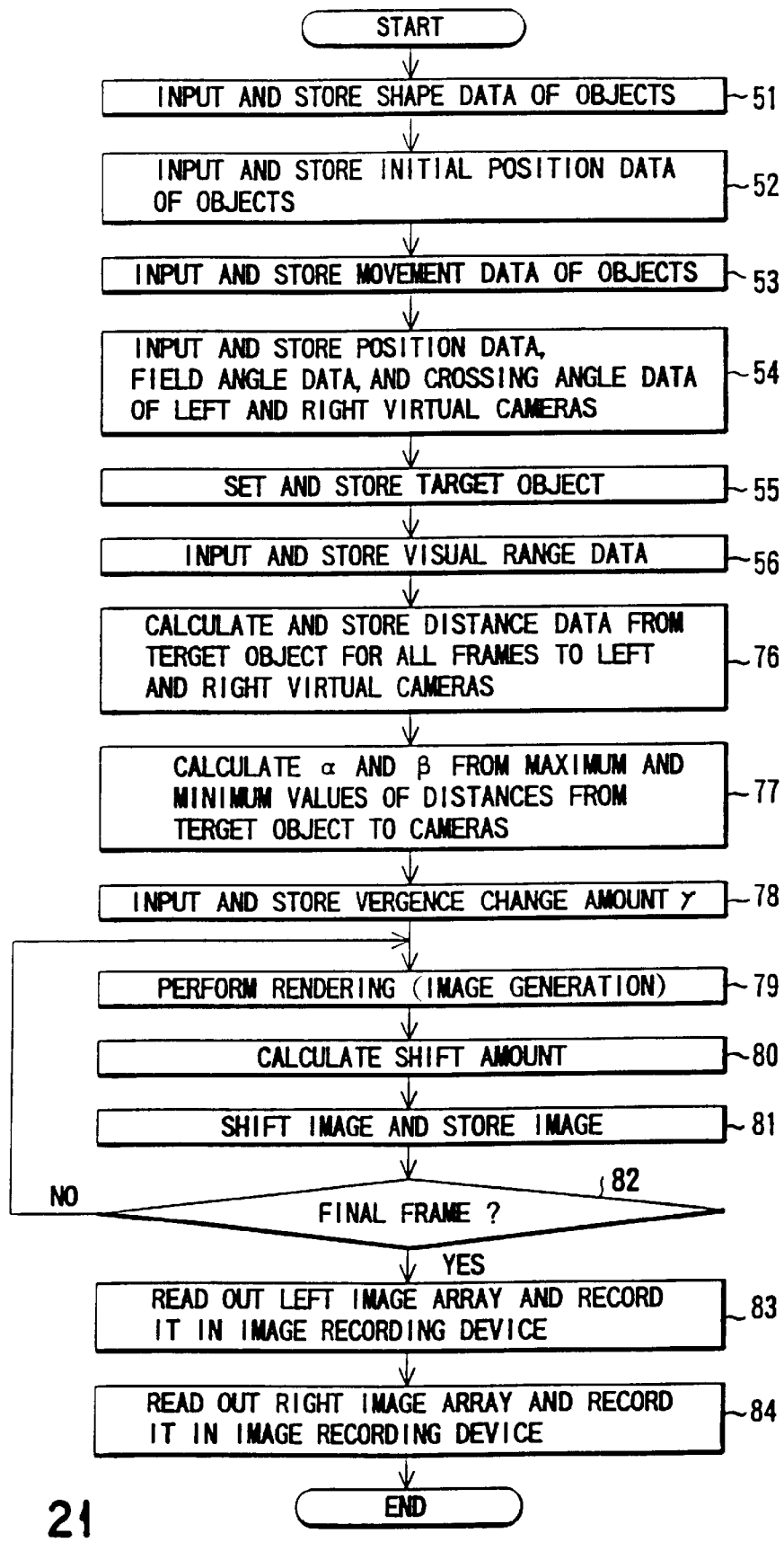
FIG. 21 is a flow chart showing stereoscopic image generation processing executed by a processing device according to the fourth embodiment.

FIG. 21 is a flow chart of stereoscopic image generation processing executed by a processing device 11 of FIG. 6 in the fourth embodiment. Steps 51 to 56 are identical to those of the first embodiment in FIG. 7, and a detailed description thereof will be omitted.

In step 76, the processing device 11 reads out the data stored in steps 51 to 56, calculates the distances from the target object to the viewpoint for all the frames, and stores the calculated distances in an external storage device 14.

In step 77, the processing device 11 obtains a and β in equation (12) from the maximum and minimum values of the distances from the target object to the viewpoint, which values are obtained in processing of step 76. The processing device 11 stores the minimum value a and the maximum value β in the external storage device 14.

In step 78, the processing device 11 stores an input vergence change amount γ of the target object in the external storage device 14.

Processing in steps 79 to 84 is identical to that in steps 57 and 59 to 63 of the first embodiment in FIG. 7, and a detailed description thereof will be omitted.

In the calculation of the shift amount S in step 80, the processing device 11 uses equation (12) or (13) or condition (14).

According to this embodiment, a stereoscopic image which can give a sufficient stereoscopic impression while a change in pop-up amount of the target object is kept small can be finally generated using a computer.

In addition, according to this embodiment, since the range of changes in pop-up amount is set in a region near and centered on the visual range, a more easily observed image for the observer can be generated.

Figure 22:
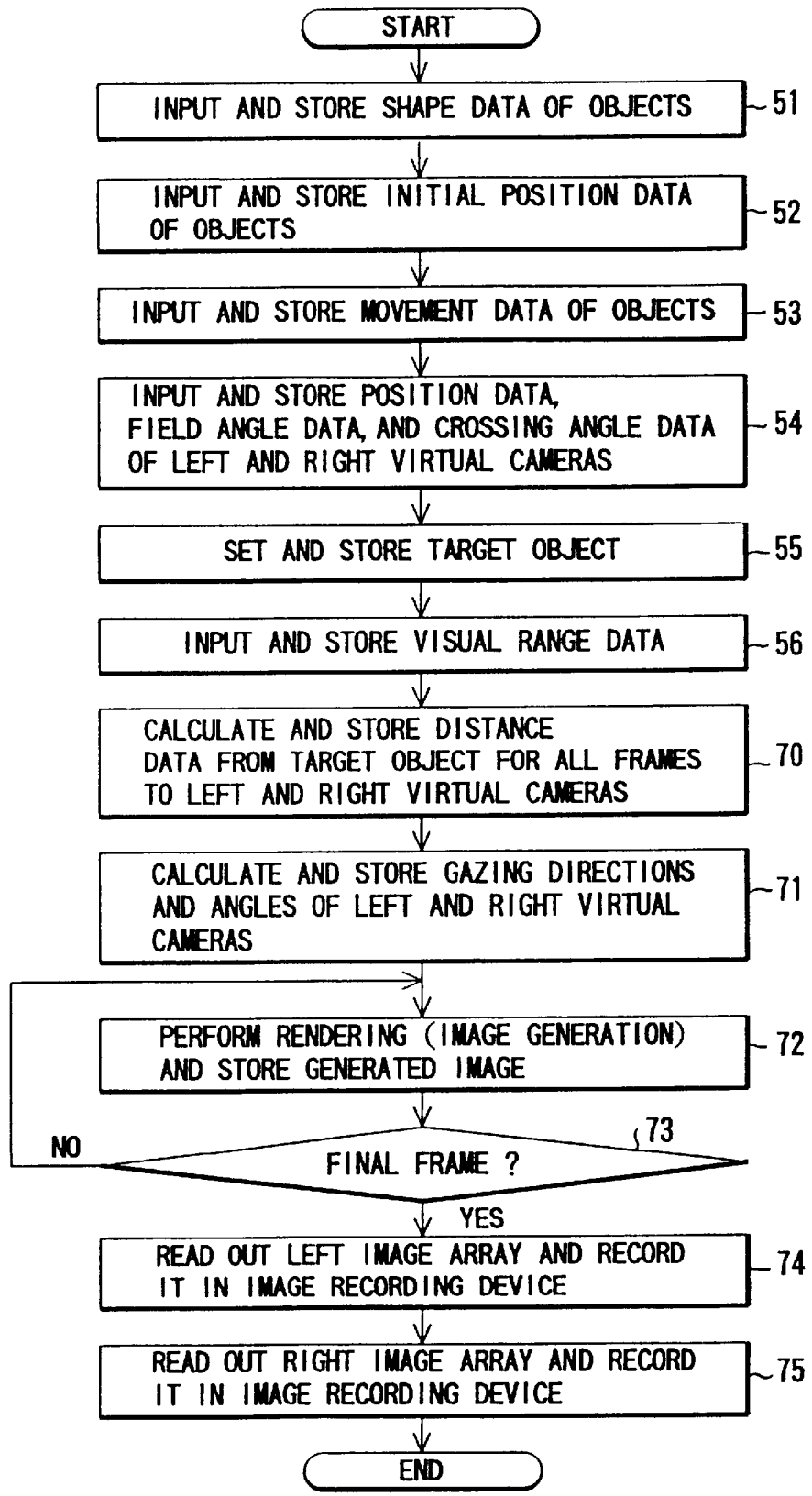
FIG. 22 is a flow chart showing stereoscopic image generation processing executed by a processing device according to the fifth embodiment.

FIG. 22 is a flow chart showing stereoscopic image generation processing executed by a processing device of FIG. 6 according to the fifth embodiment.

The flow chart in FIG. 22 is obtained by adding step 70 between steps 56 and 71 of the flow chart of the third embodiment in FIG. 18.

This embodiment is obtained by applying the third embodiment to the scheme of the fourth embodiment. The gazing directions of left and right virtual cameras 4L and 4R are controlled so that a change in distance caused by the original image vergence is compressed in a region near the visual range to apply a change by the vergence distance.

At this time, a gazing direction angle ψ of the left or right virtual camera 4L or 4R is defined as an angle (ψ=ω−m) obtained by subtracting a fixed angle θ from an angle ω between the left or right viewpoint and a line segment obtained by connecting the left or right viewpoint and the target object. This angle ψ is changed in accordance with the distance $L_{obj}$ to the target object.

For this purpose, $L_{Tag}$ is obtained by equation (12) of the fourth embodiment.

The resultant $L_{Tag}$ is substituted into the following equation (15):

$$\Psi = \omega - \arctan\frac{d}{L_{Tag}} \quad (15)$$

Since a tolerance corresponding to about the depth of field of an eyeball is allowed as in the fourth embodiment, equation (15) can be rewritten as condition (16) as follows:

$$\omega - \arctan\left[\frac{d}{1000} \cdot \left\{\frac{1000}{L_{Tag}} + 1\right\}\right] < \Psi < \omega - \arctan\left[\frac{d}{1000} \cdot \left\{\frac{1000}{L_{Tag}} - 1\right\}\right] \quad (16)$$

In step 70 of the flow chart in FIG. 22, the processing device 11 calculates α and β in equation (12) from the maximum and minimum values of the distances from the target object to the viewpoint for all the frames, which values are calculated on the basis of the data stored in steps 51 to 56. The processing device 11 stores the minimum value a and the maximum value β in an external storage device 14.

In step 71, the processing device 11 calculates the gazing directions of the left and right virtual cameras 4L and 4R as in the fourth embodiment. Equation (15) is used to calculate the gazing directions.

Steps 72 to 75 are identical to those of the third embodiment, and a detailed description thereof will be omitted.

According to this embodiment, a stereoscopic image which can give a sufficient stereoscopic impression while a change in pop-up amount of the target object is kept small can be finally generated using a computer.

In addition, according to this embodiment, since the range of changes in pop-up amount is set in a region near and centered on the visual range, a more easily observed image for the observer can be generated.

Furthermore, according to this embodiment, since the image shift as in the fourth embodiment is not performed, the processing speed can be advantageously increased.

Note that the relationship between the original vergence and the converted vergence is a proportional relationship, as shown in FIG. 19, in the fourth and fifth embodiments, but the present invention is not limited to this and can be replaced with a nonlinear relationship.

Figure 23:
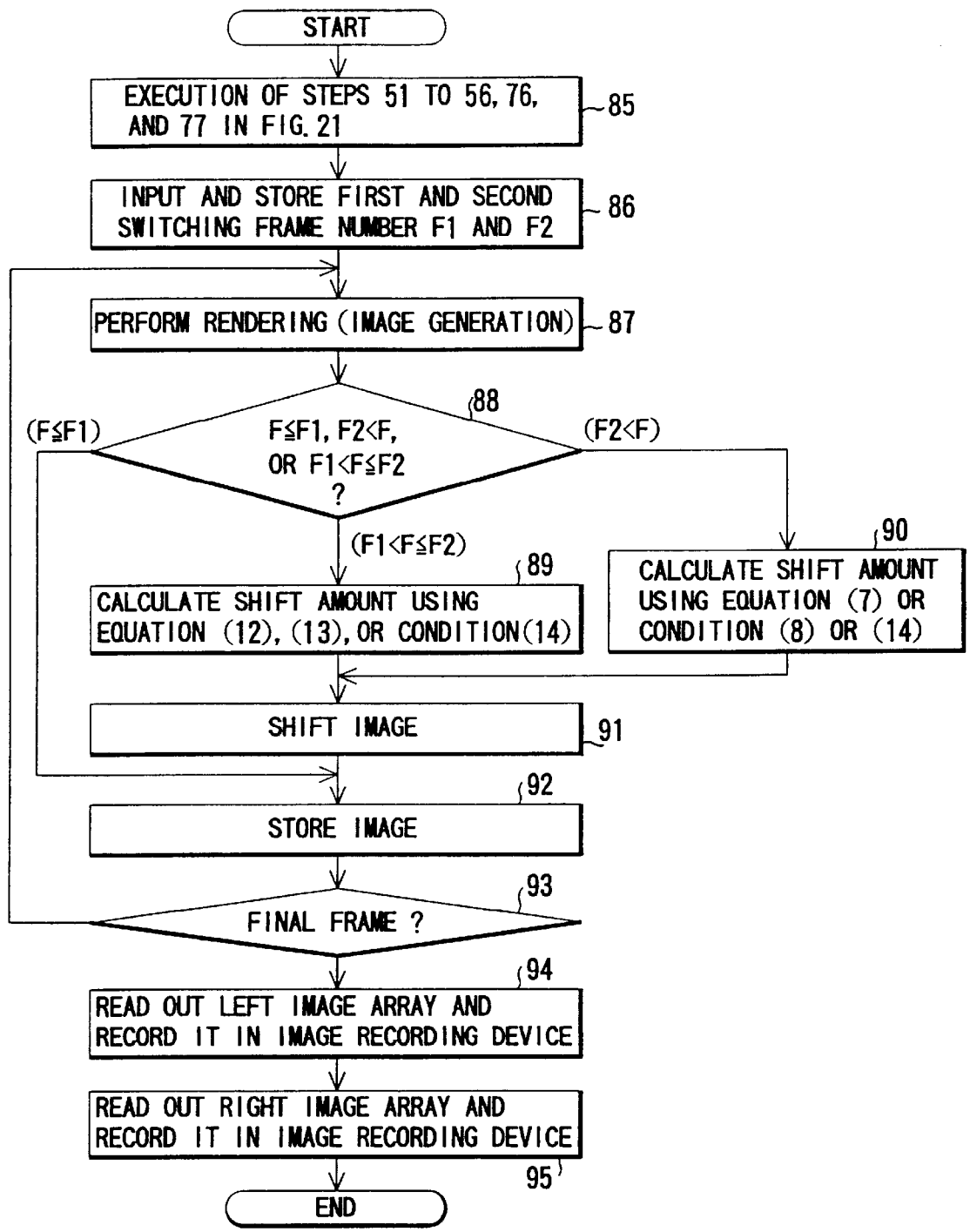
FIG. 23 is a flow chart showing stereoscopic image generation processing executed by a processing device according to the sixth embodiment.

FIG. 23 is a flow chart showing stereoscopic image generation processing executed by a processing device 11 of FIG. 6 according to the sixth embodiment.

In this embodiment, when the number of the frames of the moving picture increases, i.e., when the time has passed, a shift amount or a gazing direction is changed.

According to this scheme, in the first frame zone (e.g., initial five minutes) of the stereoscopic moving picture, images are generated by a normal stereoscopic image generating scheme as in the conventional case. When the time has passed (10 minutes after the initial five minutes), a stereoscopic image is generated in accordance with the scheme of the fourth or fifth embodiment. In a time zone from a given frame (e.g., after 10 minutes), an image is generated in accordance with the scheme of the first or second embodiment.

More specifically, in step 85 of the flow chart in FIG. 23, a processing device 11 performs processing in steps 51 to 56, 76, and 77 in FIG. 21 as in the fourth embodiment.

In step 86, the processing device 11 stores a first input switching frame number F1 and a second input switching frame number F2 in an external storage device 14.

In step 87, the processing device 11 performs rendering on the basis of the data stored in steps 51 to 56, generates the left and right two-dimensional images of the current frame photographed by left and right virtual cameras 4L and 4R, and temporarily stores the generated left and right image array data in an internal storage device 11a.

This rendering is performed as in the conventional case.

In step 88, the processing device 11 determines a correspondence between the current frame number and a specific one of the three time zones divided by the frame numbers F1 and F2. If F≦F1, then the flow immediately advances to step 92; F1<F≦F2, then to step 89; and F2<F, then to step 90.

In step 89, the processing device 11 calculates a shift amount S using equation (12) or (13) or condition (14) as in the fourth embodiment.

In step 90, the processing device 11 calculates the shift amount S using equation (7) or condition (8) or (9) as in the first embodiment.

In step 91, an image is shifted using the shift amount S calculated in step 90.

In step 92, the processing device 11 stores one-frame left and right images of the generated left and right images in the external storage device 14.

Processing in steps 93 to 95 is identical to that in steps 82 to 84 in the fourth embodiment, and a detailed description thereof will be omitted.

By the above processing, since an image having a frame number smaller than F1 is not shifted, the same image as in the image generated by the conventional generation method is obtained. An image having a frame number between F1 and F2 is horizontally shifted by the shift amount S calculated by the scheme of the fourth embodiment. An image having a frame number larger than F2 is horizontally shifted by the shift amount calculated by the same scheme as in the first embodiment.

According to this embodiment, in the first time zone (F≦F1), since the vergence distance of the target object is greatly changed, an image having an importance as a great three-dimensional impression to an observer can be generated.

According to this embodiment, when the time has passed, images having an importance as suppression of observer's asthenopia caused by stereoscopic observation are switched in the two time zones (F1<F≦F2 and F2<F).

In the flow chart shown in FIG. 23, the image shift scheme is used. However, a scheme of the second and fifth embodiments which controls the gazing directions of the left and right virtual cameras 4L and 4R may be used, as a matter of course.

In this embodiment, the image generation schemes need not be switched discretely but may be gradually switched.

This scheme is exemplified as a method of reducing γ in equation (12) when the frame number F increases.

Figure 24:
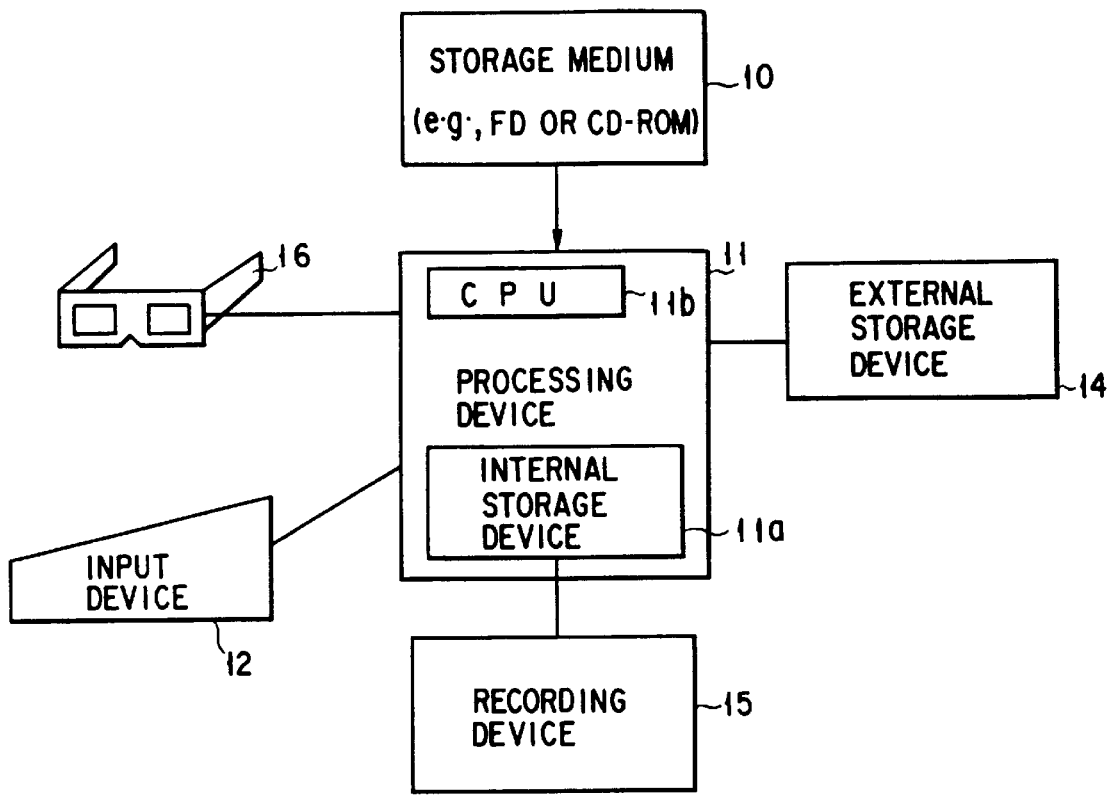
FIG. 24 is a block diagram showing the overall arrangement of a stereoscopic image generating apparatus according to the seventh embodiment of the present invention.

FIG. 24 is a block diagram showing the overall arrangement of a stereoscopic image generating apparatus according to the seventh embodiment of the present invention. The same reference numerals as in the first embodiment in FIG. 6 denote the same parts in the seventh embodiment, and a detailed description thereof will be omitted.

In this embodiment, a display for observing an image of the image generating apparatus comprises an HMD 16 in place of the display device 13 in FIG. 6. This HMD 16 is used to allow an operator to confirm data and a generated stereoscopic image.

Referring to FIG. 24, a processing device 11 alternately outputs left and right images to the HMD 16 in units of frames. These left and right images are distributed to the left and right LCDs in the HMD 16 in units of frames, thereby allowing the operator to observe a stereoscopic image.

The visual range, field angle, and crossing angle of each eyepiece optical system of the HMD 16 are preferably identical to those of each virtual camera which are set in steps 54 and 56 of FIG. 7.

The operator checks the generated stereoscopic image prior to final recording in steps 62 and 63 of FIG. 7. If the checked stereoscopic image is confirmed, it is recorded.

This embodiment has an advantage in that the operator can confirm and correct an image prior to recording.

Figure 25:
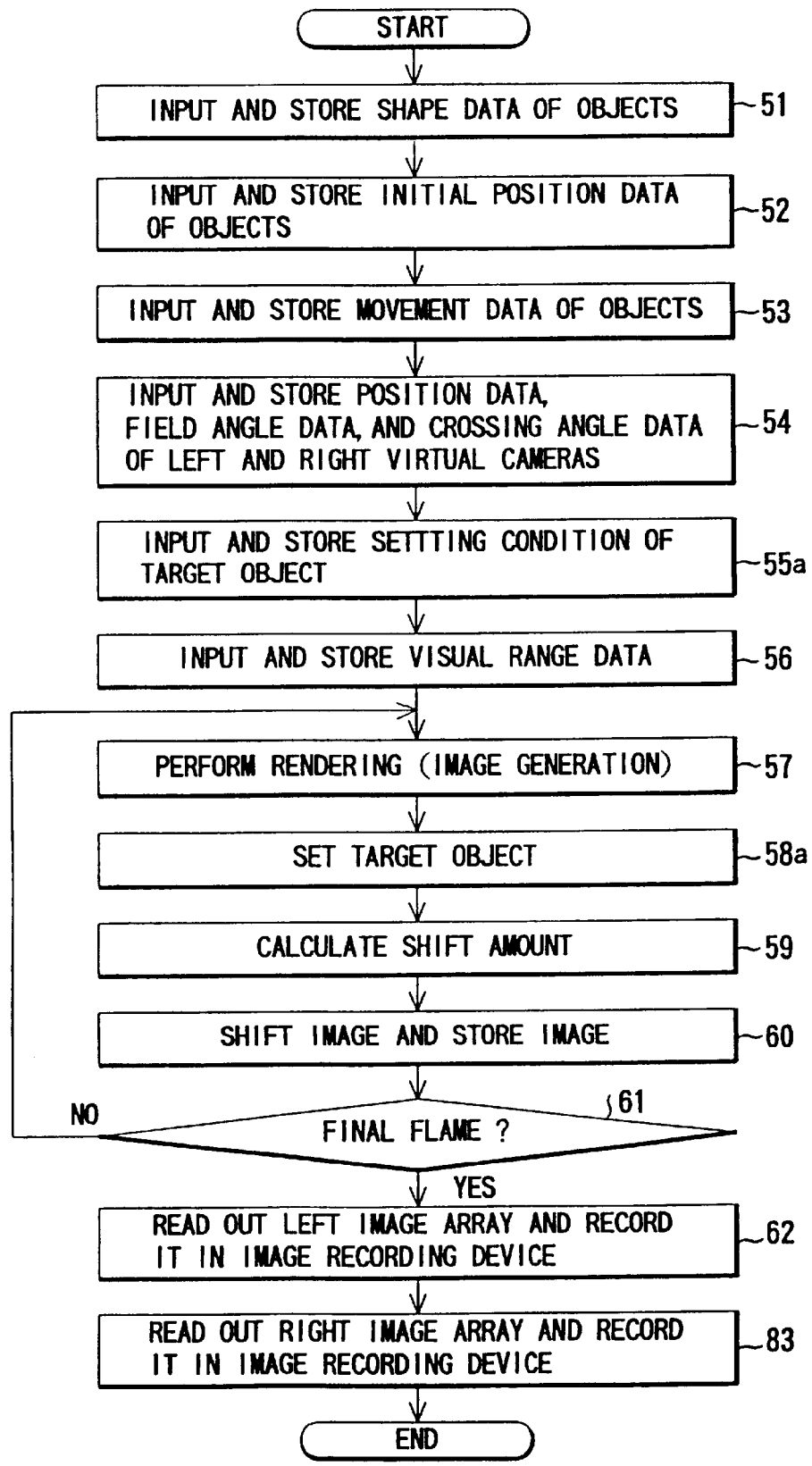
FIG. 25 is a flow chart showing stereoscopic image generation processing executed by a processing device according to the eighth embodiment.

FIG. 25 is a flow chart showing stereoscopic image generation processing executed by a processing device 11 in FIG. 6 or 24.

In this embodiment, the processing device 11 can automatically set a target object. The operator need not set a target object.

In this automatic setting, a setting condition for a target object is given as a target object which is located in the central region with respect to the horizontal and vertical field angles of virtual cameras and closest to the virtual cameras due to the following reason.

When an observer is to observe an image, he normally gazes an object located at the center and nearest to him.

Figure 26:
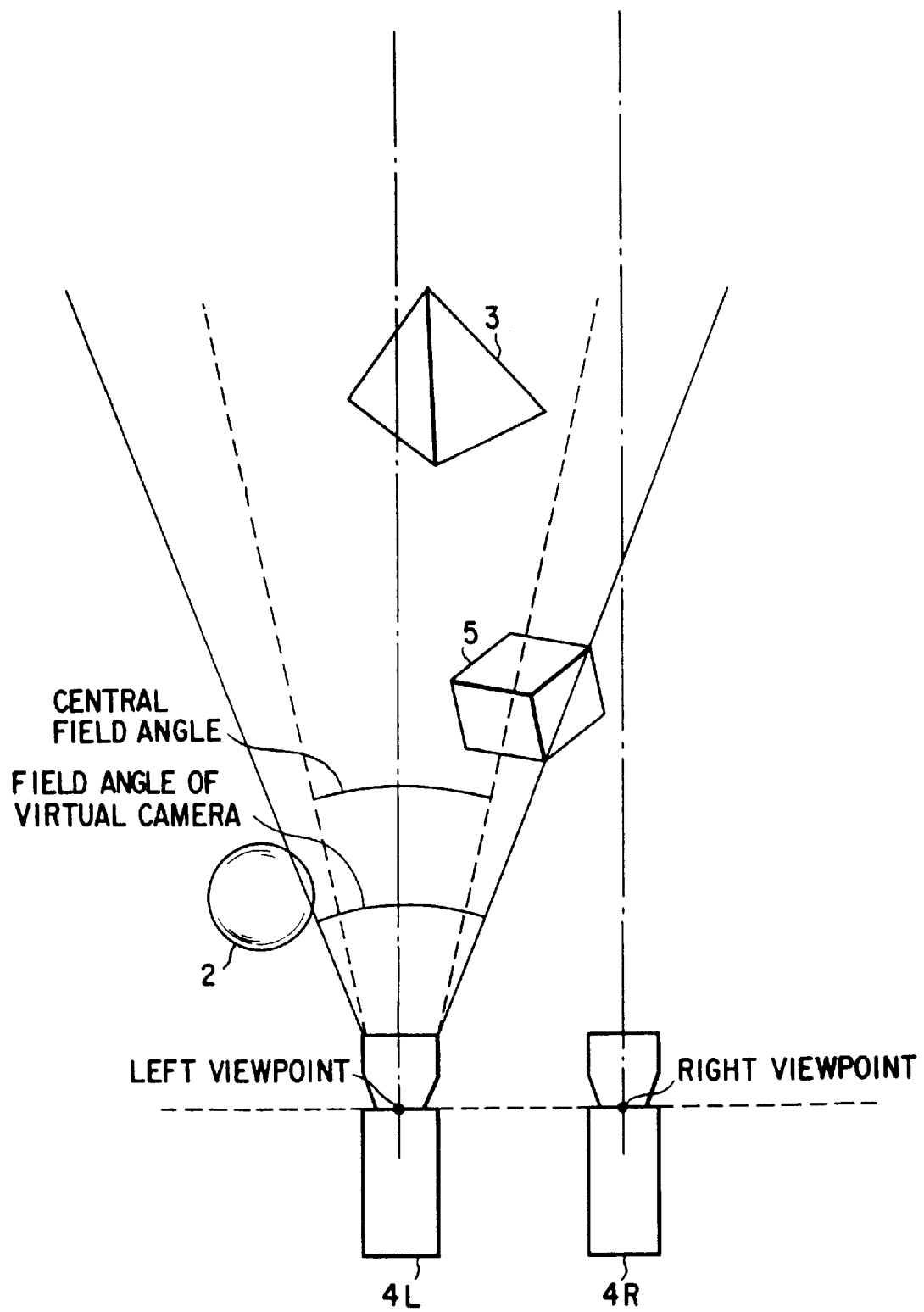
FIG. 26 is a view for explaining automatic setting conditions of a specific object according to the eighth embodiment.
Figure 27:
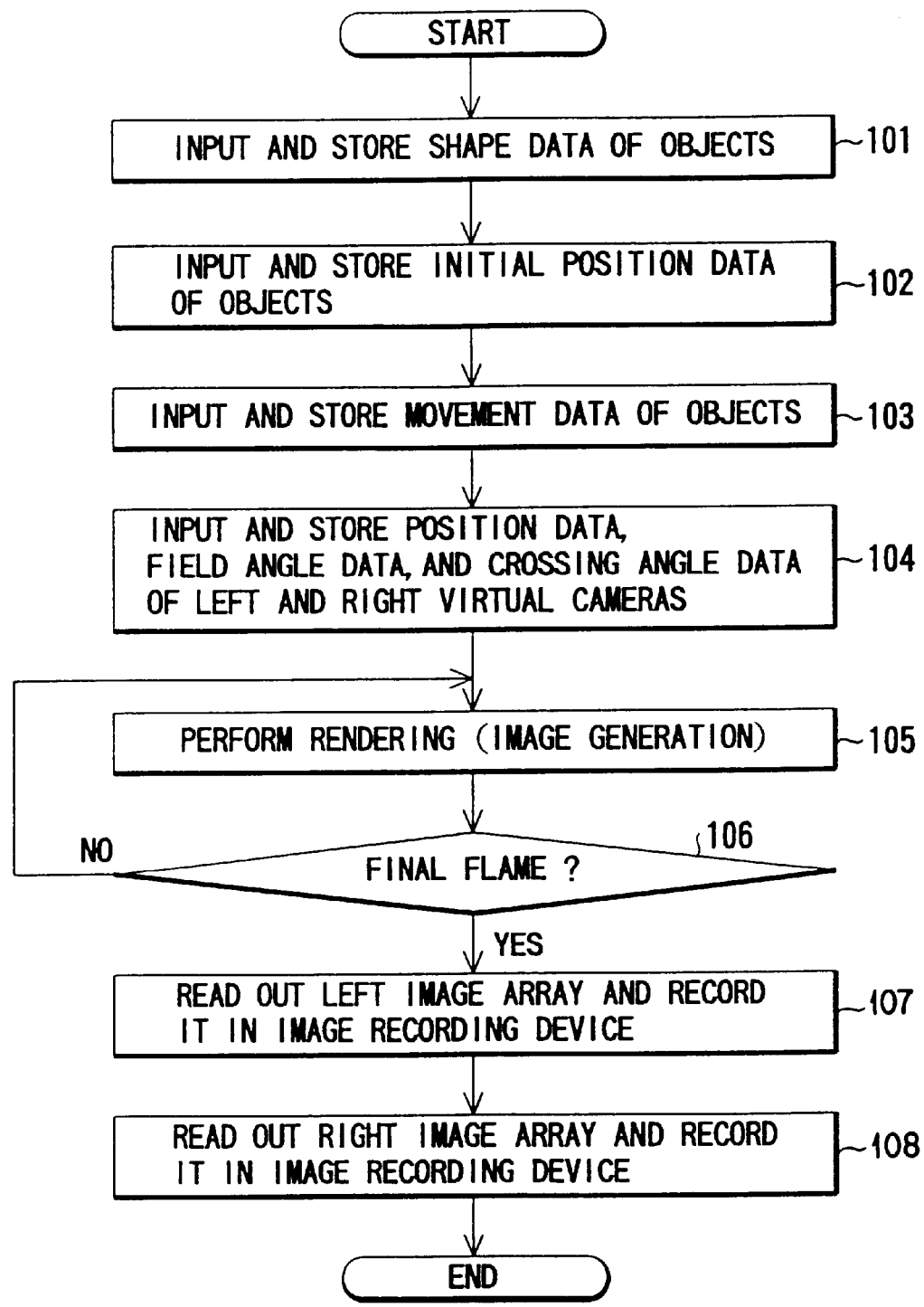
FIG. 27 is a flow chart showing conventional stereoscopic image generation processing.

This setting condition will be described with reference to FIG. 26. When a ball 2, a trigonal pyramid 3, and a rectangular prism 5 are located in front of left and right virtual cameras 4L and 4R, an object which falls within the central field angle region (dotted lines) of the virtual camera 4L and is closest to the virtual cameras 4L and 4R is the rectangular prism 5. The rectangular prism 5 serves as a target object.

In this case, the central region is preferably 50% or more of the field angle of the virtual camera.

FIG. 25 is an application in which target object automatic setting of this embodiment is applied to the first embodiment. Steps 55 and 58 in the first embodiment are replaced with steps 55a and 58a.

In step 55a, the processing device 11 stores an input target object setting condition in an external storage device 14.

In step 58a, the processing device 11 reads out the data input and stored in steps 51 to 54, 55a, and 56, searches for an object matching the setting condition in step 55a, and sets the found object as a target object.

According to this embodiment, since the operator need not set a target object, a target object input can be omitted. In particular, a target object input can be advantageously omitted for an image in which the target object frequently changes with time.

The above embodiment has exemplified the application to the first embodiment, but target object automatic setting can also be applied to the second to seventh embodiments.

The present invention is not limited to the particular embodiments described above. Various changes and modifications may be made within the spirit and scope of the invention.

For example, there may be provided a stereoscopic image generating apparatus characterized by comprising input means for inputting three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system, first virtual camera means for generating, on the basis of the data input from the input means, first two-dimensional image data obtained by rendering the plurality of objects in the three-dimensional coordinate system from the first viewpoint, second virtual camera means for generating, on the basis of the data input from the input means, second two-dimensional image data obtained by rendering the plurality of objects in the three-dimensional coordinate system from the second viewpoint, and two-dimensional image data control means for controlling to translate all the first and second two-dimensional image data for a specific object arbitrarily selected from the plurality of objects, so that a difference between horizontal displacement amounts from the centers of the first and second two-dimensional image data is set substantially constant (additional paragraph 1).

There may be provided a stereoscopic image generating apparatus characterized by comprising input means for inputting three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system, first virtual camera means for generating, on the basis of the data input from the input means, first two-dimensional image data obtained by rendering the plurality of objects in the three-dimensional coordinate system from the first viewpoint, second virtual camera means for generating, on the basis of the data input from the input means, second two-dimensional image data obtained by rendering the plurality of objects in the three-dimensional coordinate system from the second viewpoint, first two-dimensional image data control means for controlling to translate all the first two-dimensional data, and second two-dimensional image data control means for controlling to translate all the second two-dimensional image data in a movement amount different from a translation amount of the first two-dimensional image data control means (additional paragraph 2).

A stereoscopic image generating apparatus in that the two-dimensional image data control means changes a control amount in accordance with a distance $L_{obj}$ from the specific object to each of the first and second viewpoints in a direction of depth (additional paragraph 7).

A stereoscopic image generating apparatus according to additional paragraph 1 or 2 may be characterized by further comprising a head-mounted display including first and second display elements for receiving the controlled first and second two-dimensional image data to display images according to the first and second two-dimensional image data, and first and second eyepiece optical systems for enlarging and presenting the images displayed by the first and second display elements to first and second eyeballs of an observer, respectively (additional paragraph 8).

A stereoscopic image generating apparatus according to additional paragraph 1 or 2 may be characterized by further comprising specific object setting means for setting, as the specific object, an object of the plurality of objects which is located in a central 50% range of horizontal field angles of the first and second virtual camera means and closest to the first and second virtual camera means (additional paragraph 9).

A stereoscopic image generating apparatus according to additional paragraph 1 or 2 may be characterized in that the two-dimensional image data control means includes image data shift means for horizontally shifting the first and second two-dimensional image data in accordance with the distance from the specific object to each of the first and second viewpoints (additional paragraph 10).

A stereoscopic image generating apparatus according to additional paragraph 10 may be characterized in that the controlled first and second two-dimensional images are stereoscopically observed in a visual range $L_{Base}$, and a horizontal shift amount S thereof satisfies the following condition (19):

$$\frac{d}{1000} \cdot \left(\frac{1000}{L_{obj}} - \frac{1000}{L_{Base}} - 2\right) \cdot \frac{P_{H-half}}{\tan\theta} < S < \frac{d}{1000} \cdot \left(\frac{1000}{L_{obj}} - \frac{1000}{L_{Base}} + 2\right) \cdot \frac{P_{H-half}}{\tan\theta} \quad (19)$$

(where d is the distance between each of the first and second viewpoints and a middle point between the first and second viewpoints, $L_{obj}$ is the distance from the specific object to the middle point, O is the half field angle of each of the first and second virtual camera means, and $P_{H-half}$ is the half of the number of horizontal pixels of the second two-dimensional image) (additional paragraph 11).

A stereoscopic image generating apparatus according to additional paragraph 10 may be characterized in that the controlled first and second two-dimensional image data are stereoscopically observed in a visual range $L_{Base}$, and the two-dimensional image data control means sets a change amount $A(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition (18):

$$\frac{2d}{1000} \cdot \left(\frac{1000}{L_{Base}} - 2\right) \cdot \frac{1}{\tan\theta} \leq (x_1 - x_2) \leq \frac{2d}{1000} \cdot \left(\frac{1000}{L_{Base}} + 2\right) \cdot \frac{1}{\tan\theta} \quad (18)$$

(where d is the distance between each of the first and second viewpoints and a middle point between the first and second viewpoints, θ is the half field angle of each of the first and second virtual camera means, $x_1$ and $x_2$ are the horizontal displacement amounts obtained by normalizing a horizontal distance of the entire two-dimensional image as 2) (additional paragraph 5).

A stereoscopic image generating apparatus according to additional paragraph 1 or 2 may be characterized in that the specific object is an object whose distance to each of the first and second viewpoints changes with time (additional paragraph 6).

A stereoscopic image generating apparatus according to additional paragraph 1 or 2 may be characterized according to additional paragraph 1 or 2 may be characterized in that the two-dimensional image data control means sets control directions for the first and second two-dimensional image data to opposite directions (additional paragraph 3).

A stereoscopic image generating apparatus according to additional paragraph 1 or 2 may be characterized in that the two-dimensional image data control means sets a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition(17):

$$\Delta(x_1 - x_2) \leq \frac{8 \cdot d}{1000 \cdot \tan\theta} \quad (17)$$

(where d is the distance between each of the first and second viewpoints and a middle point between the first and second viewpoints, θ is the half field angle of each of the first and second virtual camera means, $x_1$ and $x_2$ are the horizontal displacement amounts obtained by normalizing a horizontal distance of the entire two-dimensional image as 2) (additional paragraph 4).

A stereoscopic image generating apparatus according to additional paragraph 1 or 2 may be characterized in that the controlled first and second two-dimensional images are stereoscopically observed in a visual range $L_{Base}$, and a horizontal shift amount S thereof satisfies the following condition (20) and equation (21):

$$\frac{d}{1000} \cdot \left(\frac{1000}{L_{obj}} - \frac{1000}{L_{Tag}} - 1\right) \cdot \frac{P_{H-half}}{\tan\theta} < S < \frac{d}{1000} \cdot \left(\frac{1000}{L_{obj}} - \frac{1000}{L_{Tag}} + 1\right) \cdot \frac{P_{H-half}}{\tan\theta} \quad (20)$$

for $$\frac{1000}{L_{Tag}} = \frac{2\gamma}{\beta - \alpha} \cdot \frac{1000}{L_{obj}} + \frac{1000}{L_{Base}} - \frac{\gamma(\alpha + \beta)}{\beta - \alpha} \quad (21)$$

(where d is the distance between each of the first and second viewpoints and a middle point between the first and second viewpoints, $L_{obj}$ is the distance from the specific object to the middle point, θ is the half field angle of each of the first and second virtual camera means, $P_{H-half}$ is the half of the number of horizontal pixels of the second two-dimensional image, α and β are the minimum and maximum values of original vergence values $1000/L_{obj}$ as values each obtained by multiplying a reciprocal of a distance from the specific object to each of the first and second virtual camera means in a direction of depth with 1,000, and γ is the half of the change amount of converted vergence $1000/L_{Tag}$ and satisfies $0 \leq \gamma \leq 2$ and $\gamma \leq 1000/L_{Base}$) (additional paragraph 12).

A stereoscopic image generating apparatus according to additional paragraph 10 may be characterized in that a shift amount S of the image data shift means changes in accordance with an ordinal image frame number (additional paragraph 13).

A stereoscopic image generating apparatus according to additional paragraph 10 may be characterized in that the image data shift means comprises image data extraction means for partially extracting image data upon shifting image data (additional paragraph 14).

A stereoscopic image generating apparatus according to additional paragraph 1 or 2 may be characterized in that the two-dimensional image data control means is gazing direction control means for changing gazing directions of the first and second virtual camera means in accordance with the distance from the specific object to each of the first and second viewpoints (additional paragraph 15).

A stereoscopic image generating apparatus according to additional paragraph 15 may be characterized in that the controlled first and second two-dimensional images are stereoscopically observed in a visual range $L_{Base}$, and a gazing direction angle ψ of each of the first and second virtual camera means satisfies the following condition(22):

$$\omega - \arctan\left[\frac{d}{1000} \cdot \left\{\frac{1000}{L_{Base}} + 2\right\}\right] < \Psi < \omega - \arctan\left[\frac{d}{1000} \cdot \left\{\frac{1000}{L_{Base}} - 2\right\}\right] \quad (22)$$

(where d is the distance between each of the first and second viewpoints and a middle point between the first and second viewpoints, and ω is the angle between each of the first and second viewpoints and a line segment obtained by connecting a corresponding one of the first and second viewpoints and the specific object) (additional paragraph 16).

A stereoscopic image generating apparatus according to additional paragraph 15 may be characterized in that the controlled first and second two-dimensional images are stereoscopically observed in a visual range $L_{Base}$, and a gazing direction angle ψ of each of the first and second virtual camera means satisfies the following condition (23) and equation (24):

$$\omega - \arctan\left[\frac{d}{1000} \cdot \left\{\frac{1000}{L_{Tag}} + 1\right\}\right] < \Psi < \omega - \arctan\left[\frac{d}{1000} \cdot \left\{\frac{1000}{L_{Tag}} - 1\right\}\right] \quad (23)$$

for $$\frac{1000}{L_{Tag}} = \frac{2\gamma}{\beta - \alpha} \cdot \frac{1000}{L_{obj}} + \frac{1000}{L_{Base}} - \frac{\gamma(\alpha + \beta)}{\beta - \alpha} \quad (24)$$

(where d is the distance between each of the first and second viewpoints and a middle point between the first and second viewpoints, $L_{obj}$ is the distance from the specific object to the middle point, ω is the angle between each of the first and second viewpoints and a line segment obtained by connecting a corresponding one of the first and second viewpoints and the specific object, α and β are the minimum and maximum values of original vergence values $1000/L_{obj}$ as values each obtained by multiplying a reciprocal of a distance from the specific object to each of the first and second virtual camera means in a direction of depth with 1,000, and γ is the half of the change amount of converted vergence $1000/L_{Tag}$ and satisfies $0 \leq \gamma \leq 2$ and $\gamma \leq 1000/L_{Base}$) (additional paragraph 17).

A stereoscopic image generating apparatus according to additional paragraph 15 may be characterized in that the gazing directions of the first and second virtual camera means which are controlled by the gazing direction control means are changed in accordance with an ordinal image frame number (additional paragraph 18).

There may be provided a stereoscopic image generating apparatus for generating moving pictures of left and right viewpoints, characterized by comprising virtual camera means for rendering a plurality of images including at least one image whose size changes with time in each of the moving pictures of the left and right viewpoints, so that the plurality of images have a parallax, first image control means for controlling to translate one specific image of the images whose sizes change with time, so that a difference in the one specific image between horizontal displacement amounts from the centers of the moving pictures of the left and right viewpoints is set substantially constant, and second image control means for controlling to translate remaining images of each of the moving pictures of the left and right viewpoints with respect to the one specific image in accordance with a change in size of the one specific image (additional paragraph 19).

A stereoscopic image generating apparatus according to additional paragraph 19 may be characterized in that the first and second image control means control translation such that the one specific image is relatively separated from the remaining images when the one specific image of the images whose size changes with time is enlarged with time, and the one specific image is made to relatively come close to the remaining images when the one specific image of the images whose size changes with time is reduced with time (additional paragraph 20).

A stereoscopic image generating apparatus according to additional paragraph 19 may be characterized in that the first and second image control means do not change relative horizontal positions of the one specific image of the images whose size changes with time in translation control of moving pictures of the left and right viewpoints (additional paragraph 21).

As has been described above, according to the present invention, there can be provided a computer-aided stereoscopic image generating apparatus capable of generating a stereoscopic image which allows an observer to receive a sufficient stereoscopic impression while a change in pop-up amount of a specific object in an image is kept small without requiring an additional device like the one in Jpn. Pat. Appln. KOKOKU Publication No. 6-85590, wherein a visual range can be made to almost coincide with a vergence distance to give a natural stereoscopic impression.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A stereoscopic image generating apparatus comprising;
    storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
    first rendering means for generating, on the basis of the data stored in said storage means, first two-dimensional image data obtained by rendering the plurality of objects in the three-dimensional coordinate system from the first viewpoint;
    second rendering means for generating on the basis of the data stored in said storage means, second two-dimensional image data obtained by rendering the plurality of objects in the three-dimensional coordinate system from the second viewpoint; and
    two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant.

2. An apparatus according to claim 1, wherein said two-dimensional image data control means sets control directions for the first and second two-dimensional image data to opposite directions.

3. A stereoscopic image generating apparatus comprising;
    storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
    first rendering means for generating, on the basis of the data stored in said storage means, first two-dimensional image data obtained by rendering the plurality of objects in the three-dimensional coordinate system from the first viewpoint;
    second rendering means for generating on the basis of the data stored in said storage means, second two-dimensional image data obtained by rendering the plurality of objects in the three-dimensional coordinate system from the second viewpoint; and
    two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant,
    wherein said two-dimensional image data control means sets a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition:

$$\Delta(x_1 - x_2) \leq \frac{8 \cdot d}{1000 \cdot \tan}$$

where d is the distance between each of the first and second viewpoints and a middle point between the first and second viewpoints, $\theta$ is the half field angle of each of said first and second rendering means, $x_1$ and $x_2$ are the horizontal displacement amounts obtained by normalizing a horizontal distance of the entire two-dimensional image as 2.

4. A stereoscopic image generating apparatus comprising;
    storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
    first rendering means for generating, on the basis of the data stored in said storage means, first two-dimensional image data obtained by rendering the plurality of objects in the three-dimensional coordinate system from the first viewpoint;
    second rendering means for generating on the basis of the data stored in said storage means, second two-dimensional image data obtained by rendering the plurality of objects in the three-dimensional coordinate system from the second viewpoint; and two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein the first and second two-dimensional image data control means are stereoscopically observed in a visual range $L_{Base}$, and said two-dimensional image data control means sets a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition:

$$\frac{2d}{1000} \cdot \left(\frac{1000}{L_{Base}} - 2\right) \cdot \frac{1}{\tan\theta} \leq (x_1 - x_2) \leq \frac{2d}{1000} \cdot \left(\frac{1000}{L_{Base}} + 2\right) \cdot \frac{1}{\tan\theta}$$

where d is the distance between each of the first and second viewpoints and a middle point between the first and second viewpoints, $\theta$ is the half field angle of each of said first and second rendering means, $x_1$ and $x_2$ are the horizontal displacement amounts obtained by normalizing a horizontal distance of the entire two-dimensional image as 2.

5. An apparatus according to claim 1, wherein the specific object is an object whose distance to each of the first and second viewpoints changes with time.

6. An apparatus according to claim 1, wherein said two-dimensional image data control means changes a control amount in accordance with a distance $L_{obj}$ from the specific object to each of the first and second viewpoints in a direction of depth.

7. An apparatus according to claim 1, further comprising a head-mounted display including:

first and second display elements for receiving the first and second two-dimensional image data controlled by said two-dimensional image data control means to display images according to the first and second two-dimensional image data; and first and second eyepiece optical systems for enlarging and presenting the images displayed by said first and second display elements to first and second eyeballs of an observer, respectively.

8. A stereoscopic image generating apparatus comprising;

storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;

first rendering means for generating, on the basis of the data stored in said storage means, first two-dimensional image data obtained by rendering the plurality of objects in the three-dimensional coordinate system from the first viewpoint;

second rendering means for generating on the basis of the data stored in said storage means, second two-dimensional image data obtained by rendering the plurality of objects in the three-dimensional coordinate system from the second viewpoint; and two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, further comprising:

specific object setting means for setting, as the specific object, an object of the plurality of objects which is located in a central 50% range of horizontal field angles of said first and second rendering means and closest to said first and second rendering means.

9. An apparatus according to claim 1, wherein said two-dimensional image data control means includes image data shift means for horizontally shifting the first and second two-dimensional image data in accordance with the distance from the specific object to each of the first and second viewpoints.

10. A stereoscopic image generating apparatus comprising;

storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;

first rendering means for generating, on the basis of the data stored in said storage means, first two-dimensional image data obtained by rendering the plurality of objects in the three-dimensional coordinate system from the first viewpoint;

second rendering means for generating on the basis of the data stored in said storage means, second two-dimensional image data obtained by rendering the plurality of objects in the three-dimensional coordinate system from the second viewpoint; and two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein the first and second two-dimensional images controlled by said two-dimensional image data control means are stereoscopically observed in a visual range $L_{Base}$, and a horizontal shift amount S thereof satisfies the following condition:

$$\frac{d}{1000} \cdot \left(\frac{1000}{L_{obj}} - \frac{1000}{L_{Base}} - s\right) \cdot \frac{P_{H-half}}{\tan\theta} < S < \frac{d}{1000} \cdot \left(\frac{1000}{L_{obj}} - \frac{1000}{L_{Base}} + 2\right) \cdot \frac{P_{H-half}}{\tan\theta}$$

where d is the distance between each of the first and second viewpoints and a middle point between the first and second viewpoints, $L_{obj}$ is the distance from the specific object to the middle point, $\theta$ is the half field angle of each of said first and second rendering means, and $P_{H-half}$ is the half of the number of horizontal pixels of the second two-dimensional image.

11. A stereoscopic image generating apparatus comprising;
storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
first rendering means for generating, on the basis of the data stored in said storage means, first two-dimensional image data obtained by rendering the plurality of objects in the three-dimensional coordinate system from the first viewpoint;
second rendering means for generating on the basis of the data stored in said storage means, second two-dimensional image data obtained by rendering the plurality of objects in the three-dimensional coordinate system from the second viewpoint; and
two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein the first and second two-dimensional images controlled by said two-dimensional image data control means are stereoscopically observed in a visual range $L_{Base}$, and a horizontal shift amount S thereof satisfies the following condition:

$$\frac{d}{1000} \cdot \left(\frac{1000}{L_{obj}} - \frac{1000}{L_{Tag}} - s\right) \cdot \frac{P_{H-half}}{\tan\theta} < S < \frac{d}{1000} \cdot$$

$$\left(\frac{1000}{L_{obj}} - \frac{1000}{L_{Tag}} + 1\right) \cdot \frac{P_{H-half}}{\tan\theta}$$

$$\frac{1000}{L_{Tag}} = \frac{2\gamma}{\beta - \alpha} \cdot \frac{1000}{L_{obj}} + \frac{1000}{L_{Base}} - \frac{\gamma(a+b)}{\beta - \alpha}$$

where d is the distance between each of the first and second viewpoints and a middle point between the first and second viewpoints, $L_{obj}$ is the distance from the specific object to the middle point, $\theta$ is the half field angle of each of said first and second rendering means, $P_{H-half}$ is the half of the number of horizontal pixels of the second two-dimensional image, $\alpha$ and $\beta$ are the minimum and maximum values of original vergence values $1000/L_{obj}$ as values each obtained by multiplying a reciprocal of a distance from the specific object to each of said first and second rendering means in a direction of depth with 1,000, and $\gamma$ is the half of the change amount of converted vergence $1000/L_{Tag}$ and satisfies $0 \leq \gamma < 2$ and $\gamma \leq 1000\ L_{Base}$.

12. An apparatus according to claim 9, wherein a shift amount S of said image data shift means changes in accordance with an ordinal image frame number.

13. A stereoscopic image generating apparatus comprising;
storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
first rendering means for generating, on the basis of the data stored in said storage means, first two-dimensional image data obtained by rendering the plurality of objects in the three-dimensional coordinate system from the first viewpoint;
second rendering means for generating on the basis of the data stored in said storage means, second two-dimensional image data obtained by rendering the plurality of objects in the three-dimensional coordinate system from the second viewpoint; and
two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein said two-dimensional image data control means includes image data shift means for horizontally shifting the first and second two-dimensional image data in accordance with the distance from the specific object to each of the first and second viewpoints, and further, wherein said image data shift means comprises image data extraction means for partially extracting image data upon shifting image data.

14. An apparatus according to claim 1, wherein said two-dimensional image data control means includes gazing direction control means for changing gazing directions of said first and second rendering means in accordance with the distance from the specific object to each of the first and second viewpoints.

15. A stereoscopic image generating apparatus comprising:
storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;
first rendering means for generating, on the basis of the data stored in said storage means, first two-dimensional image data obtained by rendering the plurality of objects in the three-dimensional coordinate system from the first viewpoint;
second rendering means for generating on the basis of the data stored in said storage means, second two-dimensional image data obtained by rendering the plurality of objects in the three-dimensional coordinate system from the second viewpoint; and
two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein said two dimensional image data control means includes gazing direction control means for changing gazing directions of said first and second rendering means in accordance with the distance from the specific object to each of the first and second viewpoints, and further wherein the first and second two-dimensional images controlled by said two-dimensional image data control means are stereoscopically observed in a visual range $L_{Base}$, and a gazing direction angle $\psi$ of each of said first and second rendering means satisfies the following condition:

$$\omega - \arctan\left[\frac{d}{1000} \cdot \left\{\frac{1000}{L_{Base}} + 2\right\}\right] < \Psi < \omega - \arctan\left[\frac{d}{1000} \cdot \left\{\frac{1000}{L_{Base}} - 2\right\}\right]$$

where d is the distance between each of the first and second viewpoints and a middle point between the first and second viewpoints, and $\omega$ is the angle between each of the first and second viewpoints and a line segment obtained by connecting a corresponding one of the first and second viewpoints and the specific object.

16. A stereoscopic image generating apparatus comprising;

storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;

first rendering means for generating, on the basis of the data stored in said storage means, first two-dimensional image data obtained by rendering the plurality of objects in the three-dimensional coordinate system from the first viewpoint;

second rendering means for generating on the basis of the data stored in said storage means, second two-dimensional image data obtained by rendering the plurality of objects in the three-dimensional coordinate system from the second viewpoint; and two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein said two dimensional image data control means includes gazing direction control means for changing gazing directions of said first and second rendering means in accordance with the distance from the specific object to each of the first and second viewpoints, and further wherein the first and second two-dimensional images controlled by said two-dimensional image data control means are stereoscopically observed in a visual range $L_{Base}$, and a gazing direction angle $\psi$ of each of said first and second rendering means satisfies the following condition:

$$\omega - \arctan\left[\frac{d}{1000} \cdot \left\{\frac{1000}{L_{Tag}} + 1\right\}\right] < \Psi < \omega - \arctan\left[\frac{d}{1000} \cdot \left\{\frac{1000}{L_{Tag}} - 1\right\}\right]$$

for $$\frac{1000}{L_{Tag}} = \frac{2\gamma}{\beta - \alpha} \cdot \frac{1000}{L_{obj}} + \frac{1000}{L_{Base}} - \frac{\gamma(a+b)}{\beta - \alpha}$$

where d is the distance between each of the first and second viewpoints and a middle point between the first and second viewpoints, $L_{obj}$ is the distance from the specific object to the middle point, $\omega$ is the angle between each of the first and second viewpoints and a line segment obtained by connecting a corresponding one of the first and second viewpoints and the specific object, $\alpha$ and $\beta$ are the minimum and maximum values of original vergence values $1000/L_{obj}$ as values each obtained by multiplying a reciprocal of a distance from the specific object to each of said first and second rendering means in a direction of depth with 1,000, and $\gamma$ is the half of the change amount of converted vergence $1000/L_{Tag}$ and satisfies $0 \leq \gamma < 2$ and $\gamma \leq 1000/L_{Base}$.

17. A stereoscopic image generating apparatus comprising;

storage means for storing three-dimensional shape data of a plurality of objects, initial position data of the plurality of objects in a three-dimensional coordinate system, motion data of the plurality of objects in the three dimensional coordinate system, and position data of first and second viewpoints in the three dimensional coordinate system;

first rendering means for generating, on the basis of the data stored in said storage means, first two-dimensional image data obtained by rendering the plurality of objects in the three-dimensional coordinate system from the first viewpoint;

second rendering means for generating on the basis of the data stored in said storage means, second two-dimensional image data obtained by rendering the plurality of objects in the three-dimensional coordinate system from the second viewpoint; and two dimensional image data control means for controlling to translate all two-dimensional image data of at least one of the first and second two-dimensional image data which are obtained by said first and second rendering means for a specific object arbitrarily selected from the plurality of objects, so that a difference between horizontal displacement amounts from the centers of the first and second two-dimensional image data is set substantially constant, wherein said two dimensional image data control means includes gazing direction control means for changing gazing directions of said first and second rendering means in accordance with the distance from the specific object to each of the first and second viewpoints, and further wherein said gazing directions of said first and second rendering means which are controlled by said gazing direction control means are changed in accordance with an ordinal image frame number.

18. A stereoscopic image generating apparatus for generating moving pictures of left and right viewpoints, comprising:

rendering means for rendering a plurality of images including at least one image whose size changes with time in each of the moving pictures of the left and right viewpoints, so that the plurality of images have a parallax;

first image control means for controlling to translate one specific image of the images whose sizes change with time and which are rendered by said rendering means, so that a difference in said one specific image between horizontal displacement amounts from the centers of the moving pictures of the left and right viewpoints is set substantially constant; and second image control means for controlling to translate remaining images of each of the moving pictures of the left and right viewpoints with respect to said one specific image in accordance with a change in size of said one specific image rendered by said rendering means.

19. An apparatus according to claim 18, wherein said first and second image control means control translation such that said one specific image is relatively separated from the remaining images when said one specific image of the images whose size changes with time is enlarged with time, and said one specific image is made to relatively come close to the remaining images when said one specific image of the images whose size changes with time is reduced with time.

20. An apparatus according to claim 18, wherein said first and second image control means do not change relative horizontal positions of said one specific image of the images whose size changes with time in translation control of moving pictures of the left and right viewpoints.

21. A stereoscopic image generating apparatus for generating first and second moving pictures having different viewpoints, comprising:
rendering means for rendering a plurality of images including at least one image whose size changes with time in each of the first and second moving pictures, so that the plurality of images have a parallax;
first image control means for controlling one specific image of the images whose sizes change with time and which are rendered by said rendering means, so that a difference in said one specific image between horizontal displacement amounts from the centers of the first and second moving pictures is set substantially constant; and
second image control means for controlling remaining images of each of the first and second moving pictures, so that a difference in the remaining images of each of the first and second moving pictures between horizontal displacement amounts from the centers of the first and second moving pictures is changed, wherein said first and second image control means control translation such that said one specific image is relatively separated from the remaining images when said one specific image of the images whose size changes with time is enlarged with time, and said one specific image is made to relatively come close to the remaining images when said one specific image of the images whose size changes with time is reduced with time.

22. An apparatus according to claim 21, wherein said first and second image control means control translation such that said one specific image is relatively separated from the remaining images when said one specific image of the images whose size changes with time is enlarged with time, and said one specific image is made to relatively come close to the remaining images when said one specific image of the images whose size changes with time is reduced with time.

23. An apparatus according to claim 21, wherein said first and second image control means do not change relative horizontal positions of said one specific image of the images whose size changes with time in translation control of moving pictures of the left and right viewpoints.

24. A stereoscopic image generating apparatus comprising:
storage means for storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system;
first rendering means for generating, on the basis of the data stored in said storage means, first two-dimensional image data obtained by rendering the plurality of objects in the three-dimensional coordinate system from the first viewpoint;
second rendering means for generating, on the basis of the data stored in said storage means, second two-dimensional image data obtained by rendering the plurality of objects in the three-dimensional coordinate system from the second viewpoint;
first two-dimensional image data control means for controlling to translate all the first two-dimensional data generated by said first rendering means; and
second two-dimensional image data control means for controlling to translate all the second two-dimensional image data from said second rendering means in a movement amount different from a translation amount of said first two-dimensional image data control means.

25. An apparatus according to claim 24, wherein said first and second two-dimensional image data control means set control directions for the first and second two-dimensional image data to opposite directions.

26. A stereoscopic image generating apparatus comprising;
storage means for storing three-dimensional shape data of a plurality of objects, initial position data of the plurality of objects in a three-dimensional coordinate system, motion data of the plurality of objects in the three dimensional coordinate system, motion data of the plurality of objects in the three dimensional coordinate system, and position data of first and second viewpoints in the three dimensional coordinate system;
first rendering means for generating, on the basis of the data stored in said storage means, first two-dimensional image data obtained by rendering the plurality of objects in the three-dimensional coordinate system from the first viewpoint;
second rendering means for generating on the basis of the data stored in said storage means, second two-dimensional image data obtained by rendering the plurality of objects in the three-dimensional coordinate system from the second viewpoint;
first two-dimensional image data control means for controlling to translate all the first two-dimensional data generated by said first rendering means; and
second two-dimensional image data control means for controlling to translate all the second two-dimensional image data from said second rendering means in a movement amount different from a translation amount of said first two-dimensional image data control means, wherein said first and second two-dimensional image data control means set a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition:

$$\Delta(x_1 - x_2) \leq \frac{8 \cdot d}{1000 \cdot \tan\theta}$$

where d is the distance between each of the first and second viewpoints and a middle point between the first and second viewpoints, θ is the half field angle of each of said first and second, rendering means, $x_1$ and $x_2$ are the horizontal displacement amounts obtained by normalizing a horizontal distance of the entire two-dimensional image as 2.

27. An apparatus according to claim 24, wherein the first and second two-dimensional image data controlled by said first and second two-dimensional image data control means are stereoscopically observed in a vidual range $L_{Base}$, and said first and second two-dimensional image data control means set a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition:

$$\frac{2d}{1000}\cdot\left(\frac{1000}{L_{Base}}-2\right)\cdot\frac{1}{\tan\theta} \leq (x_1-x_2) \leq \frac{2d}{1000}\cdot\left(\frac{1000}{L_{Base}}+2\right)\cdot\frac{1}{\tan\theta}$$

where d is the distance between each of the first and second viewpoints and a middle point between the first and second viewpoints, $\theta$ is the half field angle of each of said first and second rendering means, $x_1$ and $x_2$ are the horizontal displacement amounts obtained by normalizing a horizontal distance of the entire two-dimensional image as 2.

28. A stereoscopic image generating apparatus comprising:

storage means for storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system;

first rendering means for generating, on the basis of the data stored in said storage means, first two-dimensional image data obtained by rendering the plurality of objects in the three-dimensional coordinate system from the first viewpoint;

second rendering means for generating, on the basis of the data stored in said storage means, second two-dimensional image data obtained by rendering the plurality of objects in the three-dimensional coordinate system from the second viewpoint;

first two-dimensional image data control means for controlling to translate all the first two-dimensional data generated by said first rendering means, and second two-dimensional image data control means for controlling to translate image data from said second rendering means in a movement amount different from a translation amount of said first two-dimensional image data control means, wherein the first and second two-dimensional image data controlled by said first and second two-dimensional image data control means are stereoscopically observed in a visual range $L_{Base}$, and said first and second two-dimensional image data control means set a change amount $\Delta(x_1-x_2)$ in an entire image of the difference $(x_1-x_2)$ between the horizontal displacement amount $x_1$ of the specific object on the first two-dimensional image and the horizontal displacement amount $x_2$ of the specific object on the second two-dimensional image to satisfy the following condition:

$$\frac{2d}{1000}\cdot\left(\frac{1000}{L_{Base}}-2\right)\cdot\frac{1}{\tan\theta} \leq (x_1-x_2) \leq \frac{2d}{1000}\cdot\left(\frac{1000}{L_{Base}}+2\right)\cdot\frac{1}{\tan\theta}$$

where d is the distance between each of the first and second viewpoints and a middle point between the first and second viewpoints, $\theta$ is the half field angle of each of said first and second rendering means, $x_1$ and $x_2$ are the horizontal displacement amounts obtained by normalizing a horizontal distance of the entire two-dimensional image of 2.

29. An apparatus according to claim 26, wherein said first and second two-dimensional image data control means change control amounts in accordance with distances $L_{obj}$ from the specific objects on the first and second two-dimensional images to the first and second viewpoints in a direction of depth.

30. An apparatus according to claim 24, further comprising a head-mounted display including:

first and second display elements for receiving the first and second two-dimensional image data controlled by said first and second two-dimensional image data control means to display images according to the first and second two-dimensional image data; and first and second eyepiece optical systems for enlarging and presenting the images displayed by said first and second display elements to first and second eyeballs of an observer, respectively.

31. An apparatus according to claim 26, further comprising:

specific object setting means for setting, as the specific objects on the first and second two-dimensional images, objects of the plurality of objects which are located in central 50% ranges of horizontal field angles of said first and second rendering means and closest to said first and second rendering means.

32. An apparatus according to claim 26, wherein said first and second two-dimensional image data control means include image data shift means for horizontally shifting the first and second two-dimensional image data in accordance with the distances from the specific objects on the first and second two-dimensional images to the first and second viewpoints.

33. An apparatus according to claim 26, wherein the first and second two-dimensional images controlled by said first and second two-dimensional image data control means are stereoscopically observed in a visual range $L_{Base}$, and a horizontal shift amount S thereof satisfies the following condition:

$$\frac{d}{1000}\cdot\left(\frac{1000}{L_{obj}}-\frac{1000}{L_{Base}}-2\right)\cdot\frac{P_{H-half}}{\tan\theta} < S < \frac{d}{1000}\cdot\left(\frac{1000}{L_{obj}}-\frac{1000}{L_{Base}}+2\right)\cdot\frac{P_{H-half}}{\tan\theta}$$

where d is the distance between each of the first and second viewpoints and a middle point between the first and second viewpoints, $L_{obj}$ are the distances from the specific objects on the first and second two-dimensional images to the middle point, $\theta$ is the half field angle of each of said first and second rendering means, and $P_{H-half}$ is the half of the number of horizontal pixels of the second two-dimensional image.

34. An apparatus according to claim 26, wherein the first and second two-dimensional images controlled by said two-dimensional image data control means are stereoscopically observed in a visual range $L_{Base}$, and a horizontal shift amount S thereof satisfies the following condition and equation:

$$\frac{d}{1000}\cdot\left(\frac{1000}{L_{obj}}-\frac{1000}{L_{Tag}}-1\right)\cdot\frac{P_{H-half}}{\tan\theta} < S < \frac{d}{1000}.$$

-continued $$\left(\frac{1000}{L_{obj}} - \frac{1000}{L_{Tag}} + 1\right) \cdot \frac{P_{H-half}}{\tan\theta}$$

for $$\frac{1000}{L_{Tag}} = \frac{2\gamma}{\beta - \alpha} \cdot \frac{1000}{L_{obj}} + \frac{1000}{L_{Base}} - \frac{\gamma(\alpha + \beta)}{\beta - \alpha}$$

where d is the distance between each of the first and second viewpoints and a middle point between the first and second viewpoints, $L_{obj}$ are the distances from the specific objects on the first and second two-dimensional images to the middle point, θ is the half field angle of each of said first and second rendering means, $P_{H-half}$ is the half of the number of horizontal pixels of each of the first and second two-dimensional image, α and β are the minimum and maximum values of original vergence values $1000/L_{obj}$ as values each obtained by multiplying a reciprocal of a distance from the specific object to each of said first and second rendering means in a direction of depth with 1,000, and γ is the half of the change amount of converted vergence $1000/L_{Tag}$ and satisfies $0 \leq \gamma \leq 2$ and $\gamma \leq 1000/L_{Base}$.

35. An apparatus according to claim 32, wherein a shift amount S of each of said image data shift means changes in accordance with an ordinal image frame number.

36. An apparatus according to claim 32, wherein said image data shift means comprises image data extraction means for partially extracting image data upon shifting image data.

37. An apparatus according to claim 26, wherein said first and second two-dimensional image data control means include gazing direction control means for changing gazing directions of said first and second rendering means in accordance with the distances from the specific objects on the first and second two-dimensional images to the first and second viewpoints.

38. An apparatus according to claim 37, wherein the first and second two-dimensional images controlled by said first and second two-dimensional image data control means are stereoscopically observed in a visual range $L_{Base}$, and a gazing direction angle ψ of each of said first and second rendering means satisfies the following condition:

$$\omega - \arctan\left[\frac{d}{1000} \cdot \left\{\frac{1000}{L_{Base}} + 2\right\}\right] < \Psi < \omega - \arctan\left[\frac{d}{1000} \cdot \left\{\frac{1000}{L_{Base}} - 2\right\}\right]$$

where d is the distance between each of the first and second viewpoints and a middle point between the first and second viewpoints, and ω is the angles between the first and second viewpoints and line segments obtained by connecting the first and second viewpoints and the specific objects on the first and second two-dimensional images.

39. An apparatus according to claim 37, wherein the first and second two-dimensional images controlled by said first and second two-dimensional image data control means are stereoscopically observed in a visual range $L_{Base}$, and a gazing direction angle ψ of each of said first and second rendering means satisfies the following condition and equation:

$$\omega - \arctan\left[\frac{d}{1000} \cdot \left\{\frac{1000}{L_{Tag}} + 1\right\}\right] < \Psi < \omega - \arctan\left[\frac{d}{1000} \cdot \left\{\frac{1000}{L_{Tag}} - 1\right\}\right]$$

for $$\frac{1000}{L_{Tag}} = \frac{2\gamma}{\beta - \alpha} \cdot \frac{1000}{L_{obj}} + \frac{1000}{L_{Base}} - \frac{\gamma(\alpha + \beta)}{\beta - \alpha}$$

where d is the distance between each of the first and second viewpoints and a middle point between the first and second viewpoints, $L_{obj}$ are the distances from the specific objects on the first and second two-dimensional images to the middle point, ω are the angles between the first and second viewpoints and line segments obtained by connecting the first and second viewpoints and the specific objects on the first and second two-dimensional images, α and β are the minimum and maximum values of original vergence values $1000/L_{obj}$ as values each obtained by multiplying a reciprocal of a distance from each specific object to each of said first and second rendering means in a direction of depth with 1,000, and γ is the half of the change amount of converted vergence $1000/L_{Tag}$ and satisfies $0 \leq \gamma \leq 2$ and $\gamma \leq 1000/L_{Base}$.

40. An apparatus according to claim 37, wherein said gazing directions of said first and second rendering means which are controlled by said gazing direction control means are changed in accordance with an ordinal image frame number.

41. An article of manufacture comprising computer readable storage medium having computer readable program code means, wherein said computer readable program code means comprises:

first computer readable program means for causing a computer to store three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system in storage means;

second computer readable program means for causing said computer to generate, on the basis of the data stored in said storage means, first two-dimensional image data obtained by rendering the plurality of objects in the three-dimensional coordinate system from the first viewpoint;

third computer readable program means for causing said computer to generate, on the basis of the data stored in said storage means, second two-dimensional image data obtained by rendering the plurality of objects in the three-dimensional coordinate system from the second viewpoint; and fourth computer readable program means for causing said computer to control to translate all two-dimensional image data of at least one of the first and second two-dimensional image data which are obtained by said computer in accordance with said second and third computer readable program means for a specific object arbitrarily selected from the plurality of objects, so that a difference between horizontal displacement amounts from the centers of the first and second two-dimensional image data is set substantially constant.

42. An article of manufacture comprising a computer readable storage medium having computer readable program code means recorded to execute processing for generating moving pictures of left and right viewpoints, wherein said computer readable program code means comprises:

first computer readable program means for causing a computer to render a plurality of images including at least one image whose size changes with time in each of the moving pictures of the left and right viewpoints, so that the plurality of images have a parallax;

second computer readable program means for causing said computer to control to translate one specific image of the images whose sizes change with time and which are rendered by said computer in accordance with said first computer readable program means, so that a difference in said one specific image between horizontal displacement amounts from the centers of the moving pictures of the left and right viewpoints is set substantially constant; and third computer readable program means for causing said computer to control to translate remaining images of each of the moving pictures of the left and right viewpoints with respect to said one specific image in accordance with a change in size of said one specific image rendered by said computer in accordance with said first computer readable program means.

43. An article of manufacture comprising a computer readable storage medium having computer readable program code means recorded to execute processing for generating first and second moving pictures having different viewpoints, wherein said computer readable program code means comprises:

first computer readable program means for causing a computer to render a plurality of images including at least one image whose size changes with time in each of the first and second moving pictures, so that the plurality of images have a parallax;

second computer readable program means for causing said computer to control one specific image of the images whose sizes change with time and which are rendered by said computer in accordance with said first computer readable program means, so that a difference in said one specific image between horizontal displacement amounts from the centers of the first and second moving pictures is set substantially constant; and third computer readable program means for causing said computer to control remaining images of each of the first and second moving pictures, so that a difference in the remaining images of each of the first and second moving pictures between horizontal displacement amounts from the centers of the first and second moving pictures is changed.

44. An article of manufacture comprising a computer readable storage medium having computer readable program code means recorded to execute processing for generating a stereoscopic image, wherein said computer readable program code means comprises:

first computer readable program means for causing a computer to store three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system;

second computer readable program means for causing said computer to generate, on the basis of the data stored in said storage means, first two-dimensional image data obtained by rendering the plurality of objects in the three-dimensional coordinate system from the first viewpoint;

third computer readable program means for causing said computer to generate, on the basis of the data stored in said storage means, second two-dimensional image data obtained by rendering the plurality of objects in the three-dimensional coordinate system from the second viewpoint;

fourth computer readable program means for causing said computer to control to translate all the first two-dimensional data generated by said computer in accordance with said second computer readable program means; and fifth computer readable program means for causing said computer to control to translate all the second two-dimensional image data from said computer in accordance with said third computer readable program means in a movement amount different from a translation amount controlled by said computer in accordance with said fourth computer readable program means.

45. A method of generating a stereoscopic image in a computer system for executing processing for generating the stereoscopic image, comprising the steps of:

storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system in storage means;

generating, on the basis of the data stored in said storage means, first two-dimensional image data obtained by rendering the plurality of objects in the three-dimensional coordinate system from the first viewpoint;

generating, on the basis of the data stored in said storage means, second two-dimensional image data obtained by rendering the plurality of objects in the three-dimensional coordinate system from the second viewpoint; and controlling to translate all two-dimensional image data of at least one of the first and second two-dimensional image data for a specific object arbitrarily selected from the plurality of objects, so that a difference between horizontal displacement amounts from the centers of the first and second two-dimensional image data is set substantially constant.

46. A method of generating moving pictures of left and right viewpoints in a computer system for executing processing for generating the moving pictures of the left and right viewpoints, comprising the steps of:

storing data in a storage means:

rendering in response to said stored data a plurality of images including at least one image whose size changes with time in each of the moving pictures of the left and right viewpoints, so that the plurality of images have a parallax;

controlling to translate one specific image of the rendered images whose sizes change with time, so that a difference in said one specific image between horizontal displacement amounts from the centers of the moving pictures of the left and right viewpoints is set substantially constant; and controlling to translate remaining images of each of the moving pictures of the left and right viewpoints with respect to said one specific image in accordance with a change in size of said rendered one specific image.

47. A method of generating first and second moving pictures having different viewpoints in a computer system for executing processing for generating the first and second moving pictures have the different viewpoints, comprising the steps of:

storing data in a storage means;

rendering a plurality of images in response to said stored data; said rendered images including at least one image whose size changes with time in each of the first and second moving pictures; so that the plurality of image have a parallax;

controlling one specific image of the rendered images whose sizes change with time, so that a difference in said one specific image between horizontal displacement amounts from the centers of the first and second moving pictures is set substantially constant; and controlling remaining images of each of the first and second moving pictures, so that a difference in the remaining images of each of the first and second moving pictures between horizontal displacement amounts from the centers of the first and second moving pictures is changed.

48. A method of generating a stereoscopic image in a computer system for executing processing for generating the stereoscopic image, comprising the steps of:

storing three-dimensional shape data of a plurality of objects, initial position data of the plurality of objects in a three-dimensional coordinate system, motion data of the plurality of objects in the three-dimensional coordinate system, and position data of first and second viewpoints in the three-dimensional coordinate system in storage means;

generating, on the basis of the data stored in said storage means, first two-dimensional image data obtained by rendering the plurality of objects in the three-dimensional coordinate system from the first viewpoint;

generating, on the basis of the data stored in said storage means, second two-dimensional image data obtained by rendering the plurality of objects in the three-dimensional coordinate system from the second viewpoint;

controlling to translate all the first two-dimensional data; and controlling to translate all the second two-dimensional image data in a movement amount different from a translation amount of said first two-dimensional image data.

* * * * *